US012101533B2

(12) United States Patent
Park et al.

(10) Patent No.: US 12,101,533 B2
(45) Date of Patent: Sep. 24, 2024

(54) METHOD AND SYSTEM FOR PROVIDING CONTENT VIA EFFICIENT DATABASE ARCHITECTURE FOR INDIVIDUALIZED TIME MANAGEMENT

(71) Applicant: Kakao Entertainment Corp., Seongnam-Si (KR)

(72) Inventors: Jeongwon Park, Seongnam-Si (KR); Yunho Park, Seongnam-Si (KR); Jaesung Lee, Seongnam-Si (KR); Hyun Kim, Seongnam-Si (KR); Sun A Choi, Seongnam-Si (KR); Taejin Park, Seongnam-Si (KR)

(73) Assignee: Kakao Entertainment Corp., Seongnam-si (KR)

( * ) Notice: Subject to any disclaimer, the term of this patent is extended or adjusted under 35 U.S.C. 154(b) by 0 days.

(21) Appl. No.: 17/909,619

(22) PCT Filed: Mar. 5, 2021

(86) PCT No.: PCT/KR2021/002766
§ 371 (c)(1),
(2) Date: Sep. 6, 2022

(87) PCT Pub. No.: WO2021/177787
PCT Pub. Date: Sep. 10, 2021

(65) Prior Publication Data
US 2023/0319364 A1     Oct. 5, 2023

(30) Foreign Application Priority Data

Mar. 6, 2020   (KR) .................. 10-2020-0028335

(51) Int. Cl.
*H04N 21/4784*     (2011.01)
*H04N 21/437*      (2011.01)
(Continued)

(52) U.S. Cl.
CPC ....... *H04N 21/4784* (2013.01); *H04N 21/437* (2013.01); *H04N 21/44204* (2013.01); *H04N 21/47211* (2013.01)

(58) Field of Classification Search
None
See application file for complete search history.

(56) References Cited

U.S. PATENT DOCUMENTS 9,693,103 B2    6/2017   Cronk et al.
2004/0117841 A1*  6/2004   Urakoshi ......... H04N 21/44209
                                                  725/89

(Continued)

FOREIGN PATENT DOCUMENTS

JP     2008135050 A     6/2008
JP     2014194624 A    10/2014

(Continued)

OTHER PUBLICATIONS

Kim, Jinhee; "KakaoPage 'if wait, then free', leads the contents payment culture"; Bridge Economics Internet Article; 2015; 4 pages.

(Continued)

*Primary Examiner* — Jason K Lin
(74) *Attorney, Agent, or Firm* — Winstead PC

(57) ABSTRACT

Embodiments relate to a method and a system for providing a content via efficient database architecture for individualized time management. According to the method and system, it is possible to perform a quick data processing simultaneously with an efficient database management through the database architecture even in a situation where the number of users and contents are greatly increased by mapping etc. between tables based on a base content associated with a quasi-free sub-contents when activation of quasi-free sub-contents is requested.

22 Claims, 10 Drawing Sheets

(51) Int. Cl.
    *H04N 21/442*    (2011.01)
    *H04N 21/472*    (2011.01)

(56) References Cited

U.S. PATENT DOCUMENTS

| | | | | |
|---|---|---|---|---|
| 2006/0155989 | A1* | 7/2006 | Nishimoto | H04N 21/4627 |
| | | | | 348/E7.056 |
| 2007/0154163 | A1* | 7/2007 | Cordray | H04N 21/47211 |
| | | | | 348/E7.071 |
| 2011/0176789 | A1* | 7/2011 | Karaoguz | H04N 21/4334 |
| | | | | 386/251 |
| 2018/0234734 | A1* | 8/2018 | Parker | H04N 21/4826 |
| 2021/0021407 | A1* | 1/2021 | Weerasinghe | H04L 9/3218 |

FOREIGN PATENT DOCUMENTS

| | | |
|---|---|---|
| JP | 6424287 B1 | 11/2018 |
| KR | 1020090044856 A | 5/2009 |
| KR | 101391587 B1 | 4/2014 |
| KR | 1020150029918 A | 3/2015 |
| KR | 10-1604303 | 5/2015 |
| KR | 1020150076286 A | 7/2015 |
| KR | 10-1553628 | 9/2015 |
| KR | 10-2016-0023419 A | 3/2016 |
| KR | 101625973 B1 | 5/2016 |
| KR | 10-2018-0100797 A | 9/2018 |
| KR | 10-2019-0038263 A | 4/2019 |

OTHER PUBLICATIONS

"International Search Report"; prepared for application No. PCT/KR2021/002766; Jun. 18, 2021; 6 pages.

Office Action for Japanese Patent Application No. 2022-552790, issued on Oct. 13, 2023.

Piccoma, an app that allows you to read manga for free if you wait, is amazing _ Thorough explanation of how to use it, 2018 (https://ebook-trend.com/app/piccoma-recommend/).

Detailed explanation of Piccoma TV's "0 yen if you wait"!, 2019 (https://appli-world.jp/posts/7673).

"Piccoma—A manga app where you can read popular manga if you wait" From popular comics to limited edition works, the latest manga are constantly appearing!, Hattori, 2018 (http://minapp.net/piccoma-2327.html).

What is Piccoma TV? If you wait, it's free. A complete explanation of the pros and cons [Video streaming service], 2018 (https://motokase.com/piccomatv-matome/).

* cited by examiner

FIG. 6A

| User ID | Content ID | User status (ticket information) | History of receiving activation request | Waiting completion time |
|---|---|---|---|---|
| User 1 | Webtoon A | 0 payment type /non-payment type ticket | O | 20.2.11 16:00 |
| | Webnovel D | 0 payment type /non-payment type ticket | O | 20.2.11 17:00 |
| ... | | | | |
| User 2 | Webtoon A | 0 payment type /non-payment type ticket | O | 20.2.11 16:05 |
| | Drama Q | 0 payment type /non-payment type ticket | O | 20.2.11 07:00 |
| ... | | | | |

FIG. 6B

| Content ID | Title of content | Type of content | Sub-content ID | Episode of sub-content | Whether quasi-free sub-content or not | Waiting period |
|---|---|---|---|---|---|---|
| Webtoon A ID | A | Webtoon | a-1 | 1 | X | |
| | | | a-s | S | O | 24 hours |
| | | | a-N | N | X | |
| Webnovel D ID | D | Webnovel | d-1 | 1 | O | |
| | | | d-N | N | X | 24 hours |
| Drama Q | Q | Drama | g-1 | 1 | X | |
| | | | g-s | S | O | 12 hours |
| | | | g-N | N | X | |

METHOD AND SYSTEM FOR PROVIDING CONTENT VIA EFFICIENT DATABASE ARCHITECTURE FOR INDIVIDUALIZED TIME MANAGEMENT

TECHNICAL FIELD

The invention relates to a technique for providing contents to users. In particular, the invention relates to a method and a system for providing at least a portion of a plurality of sub-contents constituting a content for free after a preset waiting time has elapsed via an efficient database architecture for individualized time management for each user.

BACKGROUND ART

In modern busy lives, with the development of information communication technology via an Internet, people are generally provided with various contents such as comics, dramas and films, etc. using smartphones.

Contents provision through smartphones is generally performed through platforms that serve the contents. Content consumers access the platforms that serve desired contents using their smartphones, and the smartphones download data used to execute the corresponding contents and provide the corresponding contents to the consumers.

Such platforms make profits largely in two types. The first type is free contents providing platforms that provide contents for free to increase the number of platform users and make profits through advertisements based on the increased number of users, and the second type is paid contents providing platforms that make profits by providing paid contents.

In the past, a very great reluctance in consuming paid contents was a general online consumption environment. For this reason, free contents providing platforms were dominant.

However, because free contents providing platforms make profits by indirect means such as advertisements, etc., they are difficult to stably provide various contents, and have a limitation in establishing environment providing contents with a high performance. Particularly, they may overuse advertisements for maximum profits, which results in a problem where user convenience is much reduced.

Meanwhile, in the case of paid contents providing platforms, many consumers are reluctant to purchase paid contents because they doubt whether the paid contents will satisfy consumers' needs after purchasing the paid contents.

In this situation, the applicant has introduced a business model called 'if wait, then free' into the contents service provision including webtoons, web novels, etc. The way permitting to watch contents for free if waiting for a certain of time has notably increased an influx of users into a platform and allowed to induce the users to naturally consume paid contents, leading a growth of the paid contents market including webtoons, web novels, etc. and related industries (Non-Patent Literature 1).

Prior Literatures

Non-Patent Literatures (Non-Patent Literature 1) Bridge Economics Internet Article dated Dec. 20, 2015 [KakaoPage 'if wait, then free', leads the contents payment culture]

DISCLOSURE

Technical Problem

The present invention, in one aspect, proposes a method and a system for effectively providing user-specific individualized time management when providing a portion of contents for free which is provided in principle as a fee to a user meeting certain conditions, such as a preset waiting time lapse.

It is an object of the present invention, in another aspect, to provide a content-providing method and system that solve problems that database and server have dramatically increasing load with growing number of users and contents, in a system where a waiting time is set independently for each individual content and where a viewing authorization for allowing view of a content portion for free which is provided in principle as a fee is provided independently for every individual user.

Solution to Problem

In examples of the present invention, there is provided a content-providing method for providing contents via an efficient database architecture for individualized time management, wherein the method is performed by a server configured to provide a plurality of sub-contents constituting a content, the method comprising: transmitting, based on a content information table in a database containing meta information about a content, an information about a base content comprising of a plurality of sub-contents to a user terminal—the information about said base content including whether or not a quasi-free sub-content, which is provided for free after a preset waiting time progression for a part of a content provided as a fee, is included; receiving from the user terminal a viewing request for a sub-content according to a user input, wherein the viewing request is transmitted from the user terminal together with an activation request related to a waiting-based viewing authorization for the quasi-free sub-content; mapping a user of the user terminal and a base content associated with the quasi-free sub-content for which the activation request has been received, and recording a mapping result in the user information table in the database; and initiating a progression of a predetermined waiting time based on the mapping result recorded in the user information table and a waiting period information associated with the base content included in the content information table, so as to grant the user of a waiting-based viewing authorization for one or more quasi-free sub-contents.

In examples of the present invention, there is also provided a content-providing system for providing contents via an efficient database architecture for individualized time management, wherein the system includes a server configured to provide a plurality of sub-contents constituting a content, the server being configured to: transmit, based on a content information table in a database containing meta information about a content, an information about a base content comprising of a plurality of sub-contents to a user terminal—the information about said base content including whether or not a quasi-free sub-content, which is provided for free after a preset waiting time progression for a part of a content provided as a fee, is included; receive from the user terminal a viewing request for a sub-content according to a user input, wherein the viewing request is transmitted from the user terminal together with an activation request related to a waiting-based viewing authorization for the quasi-free sub-content; map a user of the user terminal and a base content associated with the quasi-free sub-content for which the activation request has been received, and record a mapping result in the user information table in the database; and initiate a progression of a predetermined waiting time based on the mapping result recorded in the user information table and a waiting period information associated with the base content included in the content information table, so as to grant the user of a waiting-based viewing authorization for one or more quasi-free sub-contents.

Advantageous Effects of the Invention

The content-providing system according to an aspect of the present invention has an advantage of efficiently performing the above-described content-specific and user-specific individual settings through a duplex database architecture. In particular, it is possible to perform a quick data processing simultaneously with an efficient database management through the database architecture even in a situation where the number of users and contents are greatly increased by mapping etc. between tables based on a base content associated with a quasi-free sub-contents when activation of quasi-free sub-contents is requested.

Accordingly, it is possible to more efficiently manage a specific condition of a certain time elapse for each individual user. As a result, it is possible to further enhance user's platform satisfaction and fidelity and increase revenue.

The effects of the present invention are not limited to the above-mentioned effects, and other effects not mentioned herein will be clearly understood by those skilled in the art from the appended claims.

BRIEF DESCRIPTION OF DRAWINGS

FIGS. 6A and 6B are schematic diagrams illustrating a user information table and a content information table according to an example of the present invention.

Figure 1:
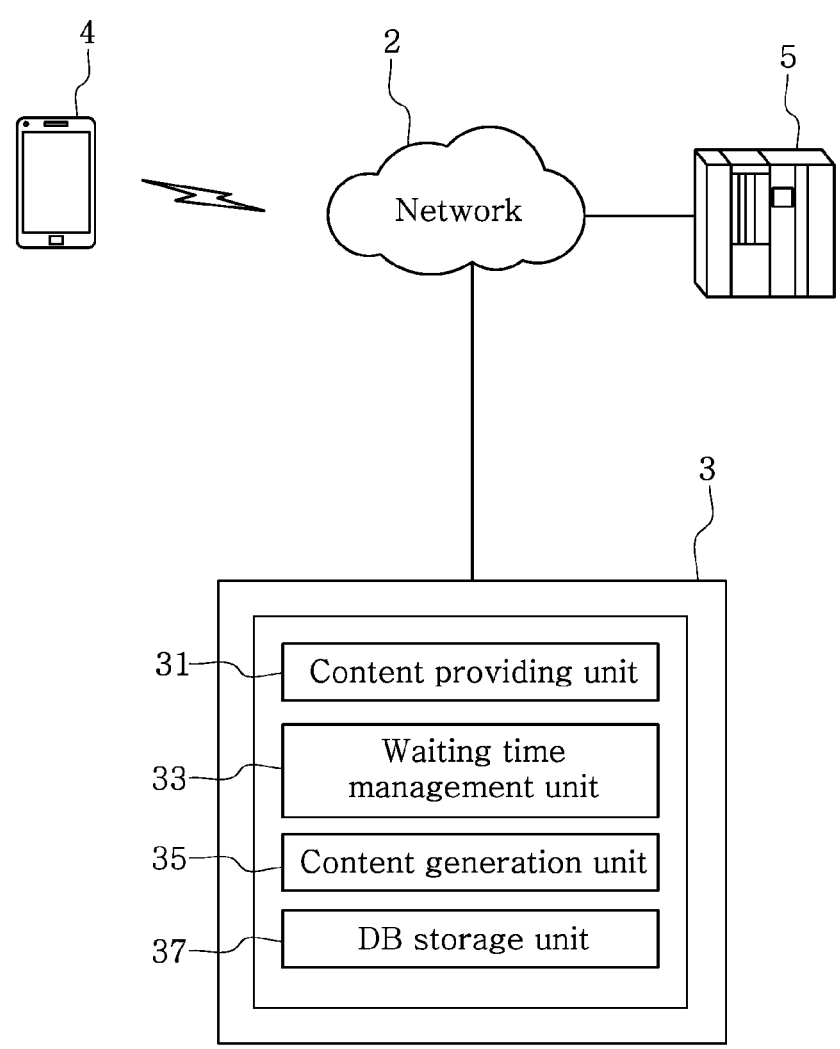
FIG. 1 is a schematic architecture diagram of a system for providing contents according to an example of the present invention.

These drawings depict various examples of the present invention for illustration purposes only. In the drawings, similar reference signs indicate identical or similar functions throughout many aspects. Those skilled in the art will be easily recognized from the following description that alternative examples to the structure and method described in the present invention may be used without departing from the invention principle described in the present invention.

MODE FOR INVENTION

The examples will be described with reference to the accompanying drawings. However, it should be noted that the principles disclosed herein may be embodied in many different forms and are not limited to the examples described herein. In the detailed description of the present invention, a detailed description of well-known features and technologies may be omitted herein to avoid unnecessary ambiguity in the features of the examples.

DEFINITION OF TERMS

In the specification, a "content provider" refers to a subject that provides information associated with webtoons, web novels, digital books, films and broadcast program, etc. Here, a "provider" refers to an "online service provider" that receives money and provides information to users (or subscribers). The content provider may include a TV station, a radio station, a Video On Demand (VOD) provider, and an Audio On Demand (AOD) provider, etc.

In the specification, "content(s)" is a concept indicating information or an individual information element that is implemented as text, images, videos, audio, or their combination and can be provided to users. The present invention is advantageous for contents provided through a platform to which a plurality of users makes access, in particular, contents having high load such as text (for example, web novels, other digital books), text combined with images (for example, webtoons), videos, etc.

In the specification, "base contents" refers to supra contents consisting of sub-contents, which is a service object produced or provided as a service by the content provider.

In an example, when the content is a video, the basic video refers to a video generally called a program (for example, in a series broadcasted by a broadcasting station, an episode (a program) may be referred to as the basic video). Alternatively, a film may be referred to as the basic video.

In another example, when the content is a text content or content of text combined with images that is generally served by volume, for example, novels (web novels), comic books (webtoons), and other digital books (webtoons and web novels are excepted, the same hereinafter), etc., the basic novel, the basic comic book, the basic book refer to one volume of novel, one volume of comic book, and one volume of book, respectively. Of course, the basic novel, the basic comic book and the basic book include those that are not yet completed and are in progress of serialization.

In the specification, "sub-content" refers to a part of a base content which is obtained by dividing the entire section of the base content into a plurality of sub-sections. For some examples, one sub-content and another sub-content may include portions that overlap each other.

In an example, when the content is a video, "sub-video" refers to a video corresponding to a sub-section when the entire section of the basic video is divided into a plurality of sub-sections by time. The sub-videos of each section are followed by sub-videos of the next section to form the entire video play section. A segment of a video commonly known as 'clip' is different from the sub-video.

Meanwhile, in a case where a content is composed of a plurality of episodes, such as a webtoon or a web novel composed of multiple episodes and a digital book composed of multiple chapters, an entire artwork consisting of plurality of episodes corresponds to a base content, and individual episodes correspond to sub-contents. In this case, each episode of the webtoon may include a portion of previous or next episode of the webtoon.

In the specification, "content information" includes various data and/or information used to implement a content. A device (e.g., a user terminal), which is serviced by a content providing system and equipped with an application that transmits and/or receives a viewing request requesting provision of a content which a user wants, may implement the content on the device upon receiving a content information and provide the content to the user. For example, when the contents are a video, video information refers to information of monomedia, multimedia and/or their subsets, i.e., a set of video components, and the video information may include video and/or audio track information, codec class information (for example, a base layer, an enhancement layer), or script information. Meanwhile, sub-content information includes various data and/or information (e.g., images, audio, text, etc.) used to implement a sub-content.

In the specification, "meta information" refers to an information related to a content, and includes a basic meta information such as server address, ID of content, title, order, interval length, capacity, etc. In addition, it may include, but not limited to, a detailed meta information such as a URL accessible to a content information, a determination value used to determine whether to include a quasi-free sub-content, etc., and may include various information indicating attributes of a content.

In the specification, "display" refers to causing arbitrary information to be recognized by a user, and "execution" (such as, for example, "playing") refers to causing components of a content (for example, in the case of a video, images such as frames) to be placed in a sequential manner so that they are recognized as the content by a user.

In the specification, "quasi-free content portion (or quasi-free sub-content)" refers to a content portion in which payment of a user is required in principle in order for the user to view the content portion, but is provided for free when a preset condition (e.g., a preset waiting time progression) is satisfied.

In the specification, the term "unit", "module", "device", "terminal", "server" or "system" etc. as used herein is intended to indicate a combination of hardware and software that runs by the corresponding hardware. For example, the hardware may be a data processing device, for example, a mobile and a PC including CPU or other processor. Additionally, the software that runs by the hardware may refer to a process being executed, an object, an executable, a thread of execution, and a program, etc.

DESCRIPTION OF EXAMPLES

Hereinafter, examples of the present invention will be described in detail with reference to the accompanying drawings.

FIG. 1 is a schematic architecture diagram of a system for providing contents according to an example of the present invention. Referring to FIG. 1, the system 1 for providing contents according to examples is configured to enable communication between a server 3 and a user terminal 4 via a network 2. In some examples, the system 1 may further include a financial institution server 5 for ticket settlement and/or a content providing server (not shown), configured to communicate with the server 3.

The server 3 communicates with a plurality of client devices 4 such as user terminals via the network 2. The communication method via the network 2 may include various communication methods that enable networking between objects, and may be wired communication, wireless communication, 3G, 4G, 5G wired Internet or wireless Internet, and besides, may be a wired public network, a wireless mobile communication network or a core network integrated with a mobile Internet, etc., and may be an open computer network that provides many services present in TCP/IP protocol and its upper layer, i.e., HTTP (Hyper Text Transfer Protocol), Telnet, FTP (File Transfer Protocol), DNS (Domain Name System), SMTP (Simple Mail Transfer Protocol), but is not limited thereto. For example, the network 2 may include, but is not limited to, a communication network by at least one communication method selected from the group consisting of LAN (Local Area Network), MAN (Metropolitan Area Network), GSM (Global System for Mobile Network), EDGE (Enhanced Data GSM Environment), HSDPA (High Speed Downlink Packet Access), W-CDMA (Wideband Code Division Multiple Access), CDMA (Code Division Multiple Access), TDMA (Time Division Multiple Access), Bluetooth, Zigbee, Wi-Fi, VoIP (Voice over Internet Protocol), LTE Advanced, IEEE802.16m, Wireless MAN-Advanced, HSPA+, 3GPP Long Term Evolution (LTE), Mobile WiMAX (IEEE 802.16e), UMB (formerly EV-DO Rev.C), Flash-OFDM, iBurst and MBWA (IEEE 802.20) systems, HIPERMAN, Beam-Division Multiple Access (BDMA), Wi-MAX (World Interoperability for Microwave Access), and communication using ultrasonic waves.

In some examples, the type of the network 2 used may be different depending on the functions and characteristics, etc. of the objects. For example, FTP network may be connected between the content providing server and the server 3, while WiFi network may be connected between the server 3 and the user terminal 4.

Referring again to FIG. 1, the server 3 includes a content providing unit 31 and a waiting time management unit 33. In addition, it further includes a database storage unit 37 for storing a content table including content-related information (for example, including content information, etc.) and a user table including user-related information. In other examples, the server 3 may include additional, smaller, or different components. For example, the server 3 may further include a content generation unit 35.

As described above, in the specification, the system and the user terminal according to examples may have aspects that are entirely hardware, or partially hardware and partially software. Accordingly, the user terminal 4, the server 3, and the components included therein such as units (or modules) (e.g., one or more of the content providing unit 31, the waiting time management unit 33, the database storage unit 37, and the content generation unit 35) may collectively refer to hardware and software related thereto for processing data having a specific format and specific contents and/or transmitting and receiving it in an electro-communication manner.

Referring to FIG. 1, each component 31-37 of the server 3 is communicatively connected to each other, but does not necessarily constitute a physically integrated device. For example, database storage unit 37 may be separate servers or computing devices communicatively located with respect to each other in a distributed computing environment. In addition, the units 31-37 merely refer to a functional division of a computing device according to operations of each unit performed on the computing device in which units are implemented, and do not necessarily refer to distinct elements separated from each other. For example, the content providing unit 31 and the waiting time management unit 33 do not necessarily refer to separate and distinct elements.

Figure 2:
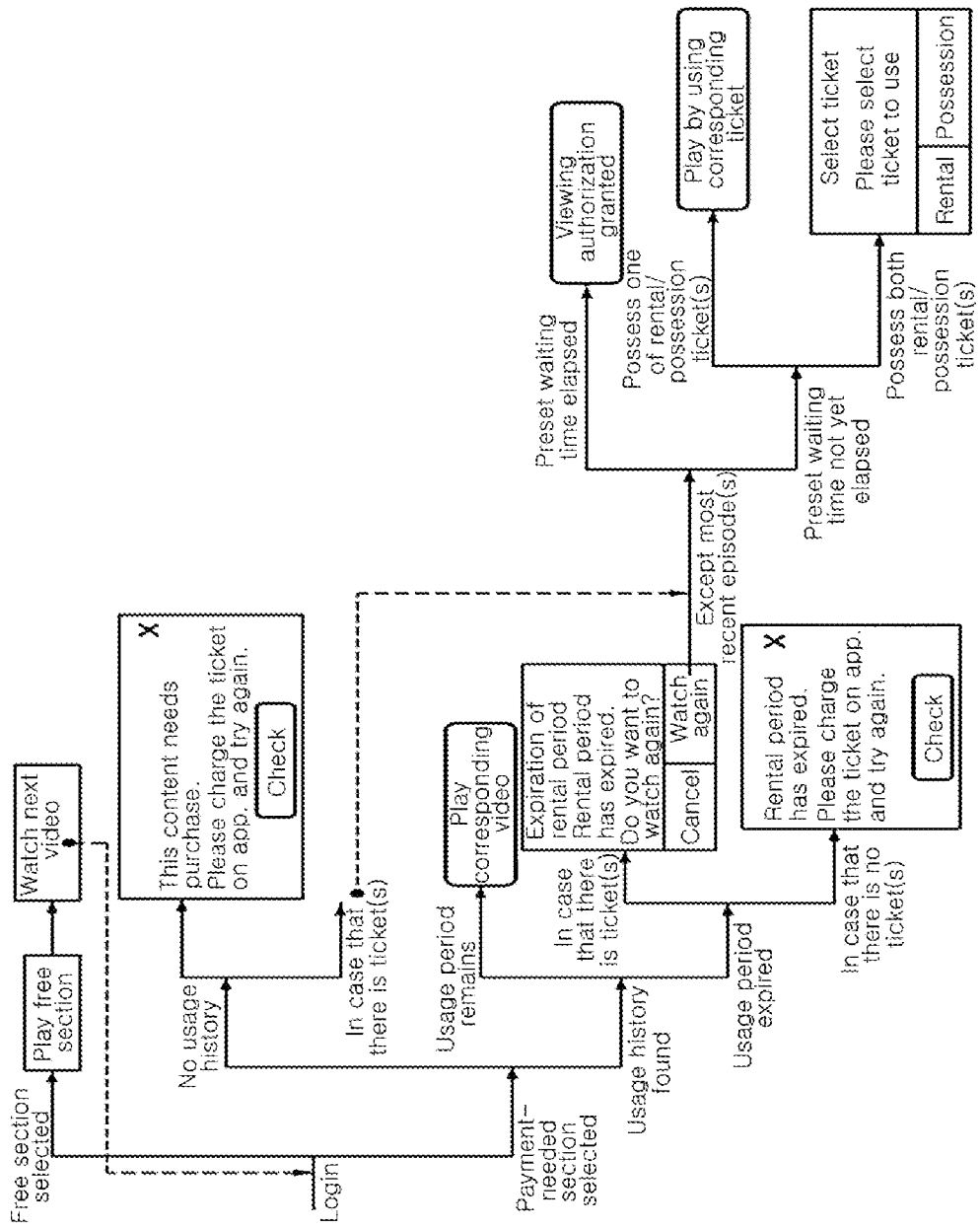
FIG. 2 is a schematic diagram illustrating a process of providing content according to an example of the present invention.

FIG. 2 is a diagram for schematically explaining a content providing process according to an example of the present invention.

The server 3 is configured to enable performance of functions of an application (or app) by communicating with the application executed on the user terminal 4. Specifically, the server 3 operates a server-based service supporting any applications that may be stored in the user terminal 4 and/or a terminal application for performing the content-providing method.

In particular, the server 3 allows distribution of a content such as a webtoon, a web novel, a digital book, a video, etc. to the user depending on whether there are tickets or not, so that the terminal application installed in the user terminal 4 may send a request for provision of the content to the server 3 automatically or in response to a request of the user, and receive the content from the server 3 [that is, the terminal application may receive data and/or information for executing the content from the server 3].

The server 3 is configured to, for example, receive a content provision request signal or a content purchase signal (this signal may include an automatic purchase signal) from the user terminal 4, verify the viewing authorization information such as tickets, and provide information about the purchased content [content information, and/or meta information, additionally, viewing authorization-related information (such as a notification of ticket exhaustion)] to the user terminal 4.

Referring to FIG. 2, the user terminal 4 connects to the content providing system by logging in etc., and receives the content-related information provided from the server 3. The content-related information includes information about whether to include a quasi-free content portion. The user terminal 4 receives the content-related information from the server 3 by a connection operation via login etc.

When receiving a request for providing content-related information from the user terminal 4, the content providing unit 31 performs a function of providing the corresponding information to the user terminal 4 in response to the request.

As described below, in one example, the content providing unit 31 may be configured to verify if there is a ticket available and execute a content providing application programming interface (API) for providing a content based on the verification result. For example, the content providing unit 31 may include a content providing API module.

The content providing unit 31 may transmit, to the user terminal 4, information associated with contents serviced for the user's selection, wherein the information is used for displaying a content home screen in which the user is provided with a basic introduction of the contents so as to select the base content and/or the sub-content. For example, the server 3 may transmit meta information of the content, which is being serviced, to the user terminal 4.

After receiving the provision request for the content selected by the user, the content providing unit 31 may transmit to the user terminal the content information (for example, including information used for implementation in the user terminal 4) of the content requested to be provided.

Such information provision is performed based on various conditions. The content providing unit 31 determines whether a user who has requested viewing of a specific content portion (for example, sub-content) is in a state satisfying a condition for receipt of viewing authorization (hereinafter, referred to as a user status), and grants an authorization to view the sub-content to the user when the conditioned is satisfied.

The content providing unit 31 determines whether it may assign the viewing authorization for the fee paying portion or the free portion, based on whether the user status is a ticket-purchased state or a waiting-completion state.

In some examples, the term "tickets" refers to a usage authorization that enables to use the content providing service and may indicate whether the user is eligible to have the viewing authorization. The tickets may be represented as a virtual money in the content providing system.

In some examples, the cash/card paid by the user is converted into electronic money in the server, which may serve as a ticket. Alternatively, it is also possible to purchase other tickets again with the electronic money. Therefore, the ticket is not necessarily limited to being purchased with actual money, but may be purchased with the electronic money or the like.

In some examples, for example, the way of purchasing the tickets may be realized in a variety of manners, such as an instant payment, a recurring payment, or an electronic voucher, etc., and is not limited to any specific manner. These tickets may be purchased as a ticket for the entire base contents, and may be purchased as an individual ticket respectively corresponding to each individual sub-content.

In some examples, a usage range of tickets may be variously set. In one example, a usage range of tickets may be set based on the contents. It is possible to set a usage range so that a user may use tickets only for the contents which are set to be within the usage range and may not use the tickets for other contents. In one example, when a content is a webtoon with multiple episodes or a series of videos, it is possible to set a usage range of tickets so that when a user purchases tickets, a user may use tickets for each episode of the webtoon or video (or a sub-video of each episode of the series).

In some examples, a user may use tickets one by one, for example, when viewing one or more sub-contents of a particular episode or episodes.

In some examples, tickets may include payment type tickets based on electronic money or fiat money and non-payment type tickets. Here, the payment type tickets may include a transient ticket (e.g., a ticket for rental, etc.) with which a user is able to use (e.g., view and/or access to) a content for a certain period of time, and a non-transient ticket (e.g., a ticket for possession, etc.) with which a user is able to use a content for more than such certain period of time.

The non-payment type tickets may include an initial ticket that allows to use a predetermined number of contents for free (e.g., a free ticket for episodes one through five of a particular webtoon), a gift ticket provided at a random time point by a service provider or provided by a third party, and an event ticket provided when a particular condition is met.

The event ticket may include a mission ticket that is provided to a user when a predetermined mission is completed. In one example, the predetermined mission may include sending a particular message to one or more other users.

Meanwhile, a viewing authorization refers to an authorization required for a user to be provided a specific content (or sub-content) via a user terminal 4.

In some examples, whether having a ticket or whether meeting certain conditions (such as having waited for a preset waiting time) may correspond to a condition for a viewing authorization to be provided.

In some examples, features of a viewing authorization may depend on features of the ticket. For example, a viewing authorization for a particular piece of artwork provided using a payment type ticket may be set to have a relatively long expiration deadline (e.g., a ticket for possession). On the other hand, a viewing authorization for a particular piece of artwork provided using a free ticket may be set to have a relatively short expiration deadline (e.g., a ticket for one day rental).

In some examples, a viewing authorization may be set for one or more episodes if a particular condition such as having waited for a preset waiting time, etc. is met.

In some examples, if ticket information is confirmed to show that there is no available ticket, the content providing unit 31 may transmit a signal to the user terminal 4 to cause the user terminal 4 to display a screen for ticket purchase necessity.

In addition, when receiving a ticket purchase request through the screen for ticket purchase necessity, the content providing unit 31 may transmit a payment request of the amount corresponding to the ticket purchase request to the card company or the financial institution server 5 to perform a series of payment processes. For a fee charging process, when personal financial information required for payment such as credit card information, financial account information, etc. is received from the user terminal 4, the content providing unit 31 may request the payment to the card company or the financial institution server 5 based on the received personal financial information. Herein, the financial institution server collectively refers to all institutions handling financial tasks, and may all include, for example, banks, securities companies, etc.

When a payment completion notification is received from the card company or the financial institution server 5, the content providing unit 31 may generate a ticket information in a user account associated with the user terminal.

In some examples, even in the absence of a ticket purchase request, the content providing unit 31 may be further configured to perform payment and generate electronic money information as a response thereto. In some examples, the electronic money information may be converted into the ticket information.

Additionally, in some examples, when a user account associated with the user terminal has one or more virtual money (e.g., electronic money or ticket), the system 1 may grant a viewing authorization for a quasi-free sub-content requested to be viewed, and record a result of deduction of one or more of the virtual money in the user information table. That is, the sub-content and the virtual money paid for viewing it may be in one to one or one to multiple relationships.

In some examples, the server 3 also determines whether a user status is a state in which a viewing authorization may be granted for a quasi-free portion of the content based on whether the user status is in the waiting completion state. In one example, if the user stat is in the waiting completion state, the server 3 may determine the user status to be a state in which a viewing authorization for the quasi-free sub-content may be granted. This will be described in more detail below with reference to FIGS. 3 to 5 and the like.

In some examples, upon receiving a viewing request for episodes of a content (i.e., sub-content) from the user terminal 4, the server 3 verifies whether the user status associated with the user terminal 4 that has transmitted the viewing request is in a ticket-purchased state or in a waiting completion state, and grants the viewing authorization, and provides information for implementing the requested portion for viewing in the user terminal 4.

In some examples, upon receiving the viewing request for the quasi-free sub-content, the server 3 may verify a ticket status after verifying whether the user status is in a waiting completion state.

The waiting time management unit 33 performs various operations related to free viewing of the quasi-free sub-content, such as an operation of transmitting, to the user terminals 4, target content information indicating whether the content accessed by the user terminal 4 includes the quasi-free sub-content, and/or an operation of initiating the progression of a preset waiting time which allows the user to view the quasi-free sub-content for free.

In one example, the waiting time management unit 33 may be configured to perform API (application programming interface) that can perform the above-described operation. For example, the server 3 may include a waiting time management API module.

Alternatively, the waiting time management unit 33 may be configured to perform a plurality of APIs, each of which partially implements the functions of the waiting time management unit 33. In one example, the waiting time management unit 33 may be configured to perform a waiting time initiation API for initiating the progression of a preset waiting time for allowing the user to view the quasi-free sub-content for free, and a waiting-based viewing authorization granting API for quasi-free sub-content, which grants the viewing authorization for the quasi-free sub-content according to the progression of the waiting time. In this case, the server 3 may include, for example, a waiting time initiation API module and a waiting-based viewing authorization granting API module for the quasi-free sub-content.

In some examples, the waiting time management unit 33 transmits information on whether the content includes quasi-free sub-content (i.e., target content information) to the user, and initiates the progression of the preset waiting time when receiving, from the user terminal 4, an activation request that initiates the progression of the preset waiting time for the target content including quasi-free sub content. This operation is performed for the target content including the quasi-free sub-content, and is not performed on non-target content which does not include the quasi-free sub-content.

Figure 3:
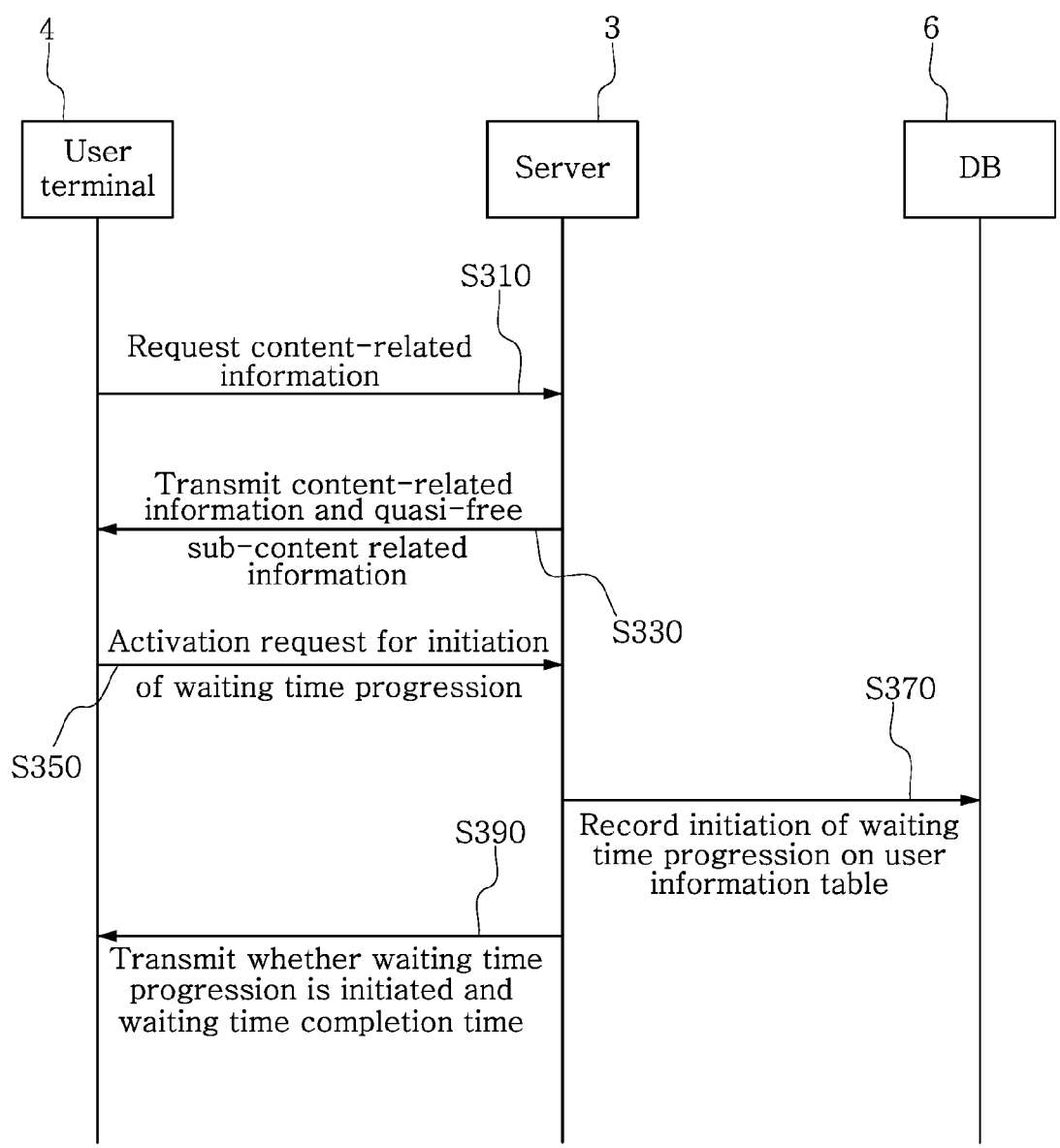
FIG. 3 is a diagram for explaining a process of initiating a progression of a waiting time according to an example of the present invention.

FIG. 3 is a diagram for explaining a process of initiating the progression of the waiting time according to an example of the present invention.

Referring to FIG. 3, the user terminal 4 requests the server 3 for content-related information (S310). The step S310 includes a step that, when the user terminal 4 accesses an app page (e.g., a content home) in which the content introduction and/or the user selection of the content is available, the user terminal 4 requests the server 3 for content-related information used for displaying the accessed content home. In addition, the step S310 further includes a step of, when the user has selected a specific service content which the user desires to view among the service contents, requesting information related to the selected content to the server 3 to display a screen including information related the selected contents. In other words, when accessing a sub-interface for the specific service content, information related to the specific service content is requested for configuring the sub-interface.

When receiving a request for content-related information from the user terminal 4, the server 3 transmits the content-related information to the user terminal 4 in response to the request (S330). In one example, the server 3 transmits, to the user terminal 4, information on whether the content is a target content including the quasi-free sub-content based on the content information table of the database storage unit 37 including meta information on the content (S330). Herein, the content information table includes a content identifier (e.g., an artwork ID), information on whether the content is a target content including quasi-free sub-content, and the like. In some examples, the content information table may further include information that the viewing authorization is limited among the target contents (e.g., such as episode numbers and/or the number of episodes which may not be viewed for free).

The response to the request transmitted when accessing the content home may further include additional information other than the content-related information. Further, when the service content is composed of a plurality of sub-contents, a sub-content request interface on which information on the sub-contents is displayed may be displayed.

For example, as shown in FIG. 2, the content home may be a web page displaying information related to a specific base content which the user intends to experience among the contents being serviced and the sub-contents constituting the specific base content.

The user terminal 4 may receive the response from the step S330 to provide the user with the content-related information to induce the user's selection. If the user has selected the base content including the quasi-free sub-content in step S310, the user terminal 4 requests information on the selected base content and provides a screen for the selected base content based on the information transmitted by the server 3 in step S330.

In some examples, the base content includes a free portion and/or a payment-needed portion, wherein the payment-needed portion includes a payment-needed sub-content and or a quasi-free sub-content. The free portion is a content portion for which purchase of a viewing authorization is not required. In some examples, upon receiving a viewing request for free sub-content, the server 3 is configured to grant a viewing authorization for the content portion to allow the user to view the free content portion. The viewing authorization for the free content portion may be maintained for a long time (e.g., while storing data after download).

Meanwhile, in some examples, the viewing authorization for the payment-needed sub-content or the quasi-free sub-content is granted to the user when the predetermined conditions for granting the viewing authorization are satisfied. The conditions for granting the viewing authorization for the payment-needed sub-content or quasi-free sub-content may include the tickets. Further, such conditions for granting the viewing authorization for the quasi-free sub-content may include a specific condition such as whether a preset waiting time has elapsed.

In some examples, when the specific service content selected in the content home is the target content, a plurality of sub-contents constituting the target content are displayed. Herein, the plurality of sub-contents include sub-content of the payment-needed portion or the free portion, and include at least a portion of the quasi-free sub-content.

In some examples, the free portion is set as episodes from the first one through the predetermined one (e.g., episodes one through five, etc.), or the payment-needed sub-content is set as episodes from the last one through the previous predetermined one (e.g., the last episode, the episode immediately preceding the last one etc.). The one or more quasi-free sub-contents may form a section between the free portion and the payment-needed portion.

The user terminal 4 may display service content items to the user based on the received service content information so as to induce the selection of the contents which the user intends to use. For example, a fourth sub-video in episode eight may be selected for any exemplary content series, as shown in FIG. 2.

In step S350, the server 3 may receive a request for activating the initiation of the progression of a preset waiting time which allows the requester to have the viewing authorization for the quasi-free sub-content for free.

Further, in step S350, the server 3 may also receive a viewing request for one of the plurality of sub-contents constituting the base content. That is, the activation request may be transmitted together with a viewing request.

The activation request for initiation of the progression of the waiting time may include an instruction for calling a waiting time initiation API (S350).

The server 3 receives the activation request from the user terminal 4, and in response to an activation condition, initiates the progression of a preset waiting time to grant the viewing authorization for the payment-needed portion even when there is no ticket available (S350).

Additionally, it is also possible, if the activation condition is preset, to make the activation request of the user terminal 4 to be performed when the preset condition is satisfied.

The condition for transmitting the activation request depends on the user's usage history (e.g., the number and types of the previous sub-contents provided at the time of viewing request), meta information on the base content as an activation-requested target (e.g., a previously given free tickets, etc.), and/or the target of the viewing request transmitted with the activation request.

In one example, if the system 1 has to transmit a viewing request for a particular sub-content, it transmits the viewing request along with an activation request. The target for which the viewing request is transmitted with the activation request may be a sub-content of a free portion or a quasi-free sub-content of a payment-needed portion. For example, an activation request may be transmitted to the server 3 along with a viewing request for a sub-content which is the last episode of the free portion, or an activation request may be transmitted to server 3 along with a viewing request for a sub-content which is the first episode of the quasi-free portion.

For example, if episodes one through five are set as free sub-contents and episodes from episode six are set as quasi-free sub-contents in a webtoon, by setting the activation condition to be satisfied when the user selects the episode five which is a free sub-content, the user terminal 4 may transmit a viewing request for the episode five as well as and an activation request to the server 3 (S350). Alternatively, by setting the activation condition to be satisfied when the user selects the episode six which is a quasi-free sub-content, the user terminal 4 may transmit the viewing request for the episode six as well as and the activation request to the server 3 (S350). Then, the server 3 initiates the progression of the waiting time to grant the free viewing authorization for a quasi-free sub-content. (e.g., a next episode of the target requested for viewing).

In another example, the system 1 may be configured to transmit an activation request to the server 3 based on the user's usage history and the meta information of the base content as the target for activation request. In the above example, if the user who has viewed at least one of the episodes one through four selects a free sub-content (the episode five, for example), the user terminal 4 transmits an activation request along with the viewing request for the selected free sub-content. Alternatively, the activation request may be performed when all of the non-purchase-based tickets which are previously granted (e.g., initial free tickets) for the content are consumed. In the above example, if ten more initial free tickets are given, an activation request may be transmitted after, for example, using such additional free tickets for the episodes six to fifteen.

As described above, this activation request for initiation of the progression of the waiting time may include an instruction for calling a waiting time initiation API (application programming interface) (S350).

Thus, the progression of the waiting time for the user is not initiated until receiving the activation request from the user terminal 4. That is, even in the case where the base content accessing the content home is the target content, the progression of the waiting time for the user is not initiated until receiving the activation request from the user terminal 4.

Further, in some examples of the above additional examples, whether the activation condition is satisfied may be determined by the user terminal 4. For example, the user terminal 4 receives an activation request when receiving a user input selecting pre-designated sub-content (the last free episode or the first quasi-free episode).

Then, in step S350, whether an individual content (individual artwork) is the target content is adjusted at the server side, but an activation request for the target content having quasi-free sub-contents as a result may also be received from the user terminal 4. Particularly, in the case where a condition (for example, a condition in which the initial free tickets—e.g., tickets to view episodes one through five for free—are all consumed) is set, the user terminal 4 determines whether the preset condition is satisfied, and therefore, even if the number of users and the target contents increase, the server 3 may have reduced burden on determining whether the condition is satisfied.

However, without being limited thereto, whether the activation condition for the initial activation request transmission is satisfied may be determined by the server 3. For example, when receiving the activation request, the server 3 may determine whether the present status is the state of satisfying a preset activation condition and determine whether to initiate a preset waiting time.

In step S350, the progression of the preset waiting time of the user for the base content is initiated and when the preset waiting time has elapsed, the viewing authorization for the user to view the quasi-free sub-content for free may be granted.

The viewing authorization is granted simultaneously with the activation request or in response to receiving a viewing request (or a providing request) for the sub-content after the activation request, instead of being granted immediately after the elapse of the preset waiting time. This will be described in more detail below with reference to FIG. 5.

In some examples, upon receiving the activation request, the server 3 maps a user of the user terminal and a base content associated with the sub-content for which the viewing request is received, and records the mapping result in the user information table in the database (S370).

In some examples, when receiving the activation request (e.g., from the waiting time management unit 33), the server 3 maps the base content with the user (i.e., requester) of the user terminal that has transmitted the viewing request and records the mapping result in the user information table in the database. If a specific sub-content is selected according to the user's input and an activation request is received thereby, the base content being mapped is the base content associated with the selected sub-content.

In steps S350 and S370, the user information table includes: a user identifier; and a content identifier for the base content associated with the user and the sub-content for which the viewing request is received as a mapping result. Further, it further includes: determination value indicating history of receiving an activation request from the user terminal; and waiting completion time for determining the progression of waiting time. In other words, the mapping between the user and the content for which the activation request is received is based on the content identifier on the content information table. The user information table and the content information table will be described in more detail with reference to FIG. 6A below.

In one example, the waiting completion time may be recorded in the user information table by the waiting time management unit 33 in response to the initiation of the progression of the waiting time. Based on the mapped user information table, whether the progression of a preset waiting time of the user has been initiated and the waiting completion time are obtained, and the information on whether the progression of the waiting time for the content has been activated and the waiting completion time are provided to the user (S390). Based on the information received in step S390, the user terminal 4 may display whether the waiting time has progressed and the time remaining in the preset preset waiting time (i.e., the remaining time until the waiting completion time). If not activated, a notification screen indicating of not being activated may be displayed on the user terminal 4.

In this way, the progression of the waiting time of the user for the sub-content of the target content in steps S310 to S390 is activated individually according to the respective user's activation request time, and this fact is stored in the database.

Therefore, the server 3 does not grant the viewing authorization for the specific content to all users at each preset time (e.g., for a specific episode B of the content A which is previously set as required to be paid, modifying such episode to be free at 13:00 on the date x of the month xx).

Further, by dualizing the table by recording the information associated with the target content in the content information table and recording the information associated with the user in the user information table, and subsequently matching them, it is possible to effectively manage the status of the initiation of the progression of the waiting time and the completion of the waiting time for each user and for each content of the same user.

The method of the examples differs from a method having a plurality of metadata tables where each metadata table includes metadata of content(s) for each user. That is, in the method where a plurality of metadata tables, each of which includes respectively metadata of content(s) for each user, as the number of users having the same content increases, metadata of the content is stored in a database in duplicate corresponding to the number of users. For example, when the first user, the second user, and the third user use the same webtoon A, the metadata of the webtoon A is stored in duplicate in all of the first-user's table, the second-user's table, and the third-users table. Also, when the metadata of the content is to be modified, the number of metadata tables required to be modified corresponds to the number of users. That is, in the method having a plurality of metadata tables, each of which includes metadata of content(s) for each user, a storage space of the metadata of content(s) and a speed of a modification operation may depend on the number of users.

On the other hand, the method according to the examples dualizes tables into a user information table and a content information table including meta information of a content, and then maps them according to an activation request. Accordingly, even when the number of users requesting activation for the same content and consuming the same content increases, the metadata of the content is not stored in duplicate as many as the number of the users. Further, editing of metadata of a content may not be affected by the number of users consuming the content. As a result, there are advantages of high efficiency due to the fast correction speed and cost reduction due to the non-duplication of the storage space in terms of the database management.

Figure 4:
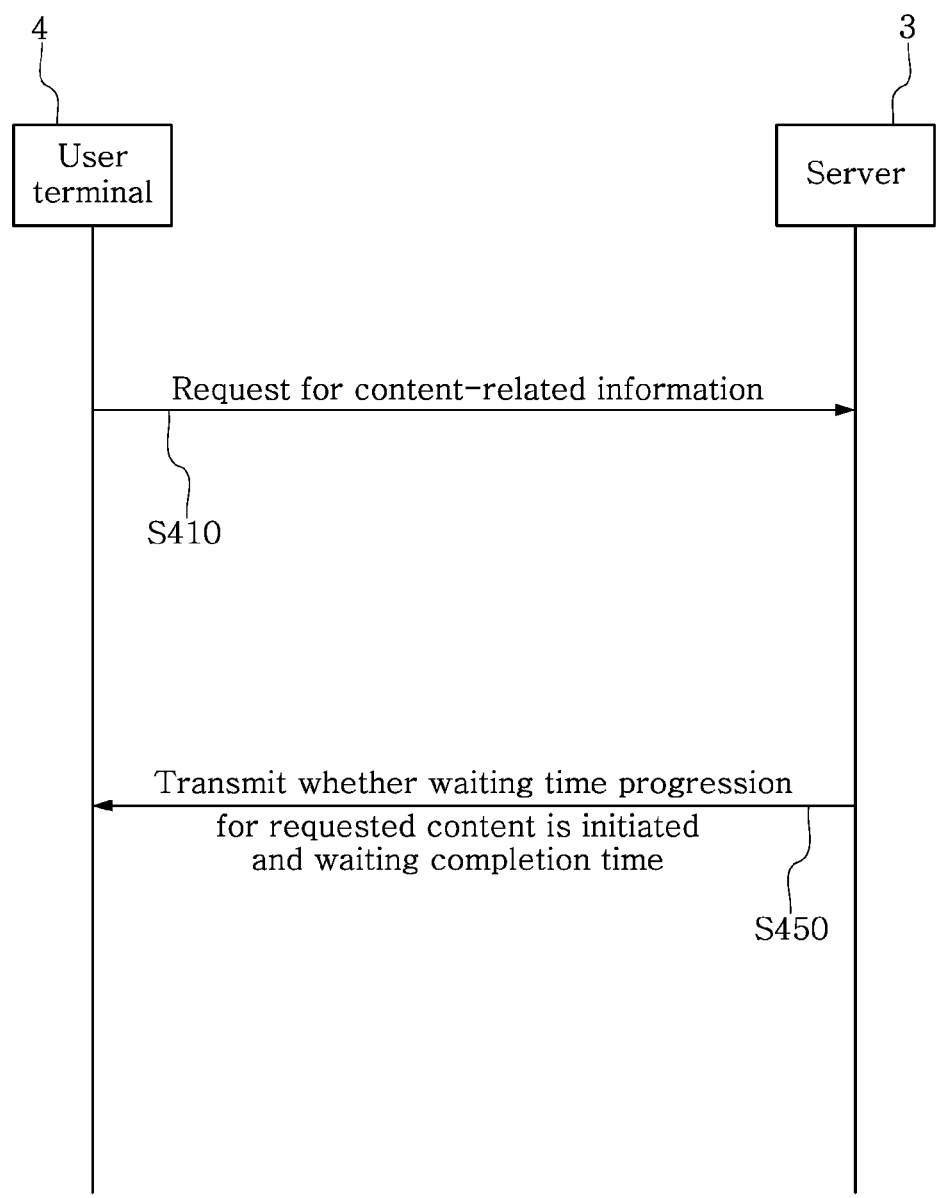
FIG. 4 is a diagram for explaining a process of displaying a waiting time-related information on a user terminal according to an example of the present invention.

FIG. 4 is a diagram for explaining a process of displaying the waiting time-related information on a user terminal according to an example of the present invention.

Referring to FIG. 4, the user terminal 4 requests the server 3 for content-related information (S410). Since the content-related information is similar to the content-related information in step S310, detailed explanation thereof is omitted.

The server 3 may transmit the requested content-related information to the user terminal 4 in a response to the request (S450). In addition, the response to the request may further include user-related information (including, for example, whether the waiting time progression has been initiated, waiting completion time, ticket information, viewing authorization information, etc.) and the like. In this case, the waiting time management unit 33 obtains content-related information mapped on the content information table based on the content identifier mapped on the user information table, determines whether the initiation of the waiting time progression for the user is activated for the content, and includes whether the waiting time progression has been initiated, the waiting completion time, etc. in the response to the request.

Based on the response received in step S450, the user terminal 4 may display whether the waiting time has progressed and the time remaining until the waiting completion time. As described above with reference to FIG. 3, the progression of the waiting time is initiated according to the usage pattern for each user, and the waiting completion time may also be different for each user.

When the waiting time progresses to pass beyond the waiting completion time, the user may use the granted viewing authorization to receive the content associated with the request in the step of FIG. 3 or 4 (step S310 or S410). Herein, the content (e.g., sub-content) associated with the request in the step (S310 or S410) includes the content in the same category (e.g., other sub-contents in the base content).

Figure 5A:
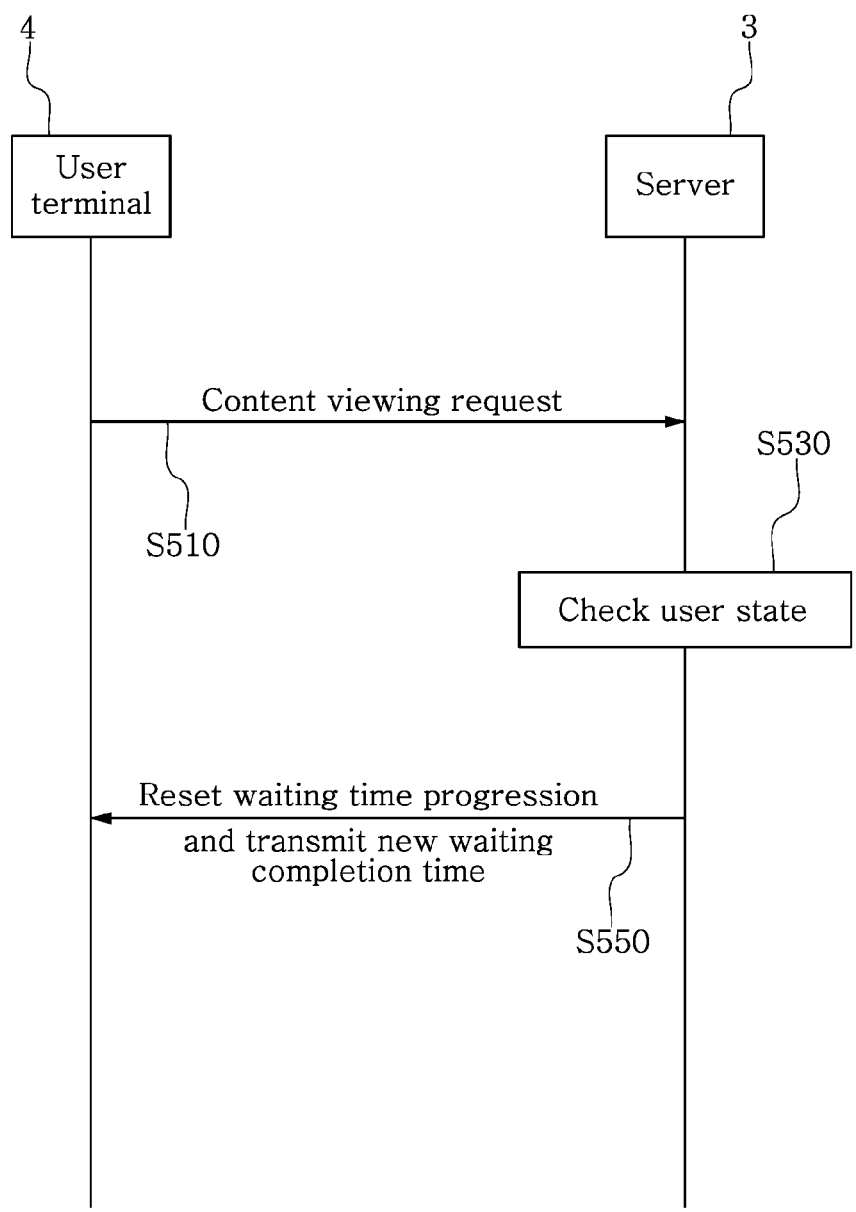
FIGS. 5A and 5B are diagrams for explaining a process of receiving a quasi-free content part for free according to an example of the present invention.
Figure 5B:
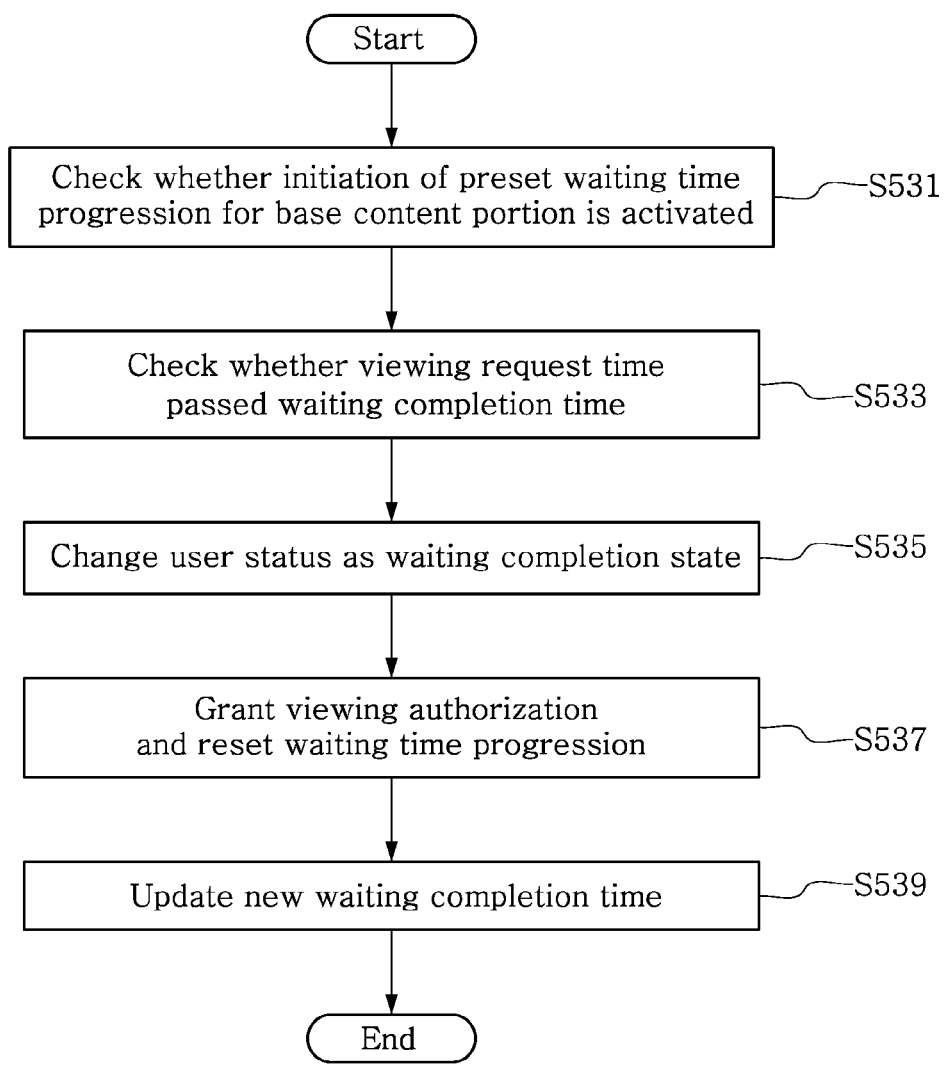

FIGS. 5A and 5B are diagrams for explaining a process of receiving a quasi-free content portion for free according to an example of the present invention.

Referring to FIG. 5A, the server 3 receives a provision request (e.g., a viewing request) for the content (such as base content or sub-content) from the user terminal 4 (S510). The provision request may be caused by an input signal sensed in the user terminal 4, but may be also caused by an instruction of an application installed in the user terminal 4. In one example, the content provision request may include a content provision API call instruction or a ticket usage API call instruction.

In addition, the server 3 verifies whether the progression of the preset waiting time of the user for the quasi-free sub-content for which viewing is requested has been initiated (i.e. verifies whether to be in an activated state) (S530). Based on the verification result, the server 3 determines whether to provide the viewing authorization for the content portion which is requested to be provided and the content information for implementing such portion.

FIG. 5B is a diagram for explaining a process of verifying whether a user status is in a waiting completion state according to an example of the present invention.

The server 3 is configured to receive an activation request before the step S533 to verify whether the progression of the waiting time has been initiated (S531). This verification may be performed based on a determination value indicating an activation included in the user information table. In some examples, in the case where the target content that is activated during the waiting time is set to no longer include the quasi-free sub-content and is excluded from the target content, if the determination value indicates an activated state, the next viewing authorization for which the progression of waiting time is ongoing may be granted to the user.

The server 3 grants the viewing authorization for the quasi-free sub-content depending on whether the user status is in the waiting completion state.

In one example, when receiving the activation request for the first time, the server 3 determines the user status as the waiting completion state. In this particular example, whether a preset waiting time has progressed or not does not have effect on the determination of the waiting completion state. Whether to determine the user status as a waiting completion state after the first activation request depends on whether a preset waiting time has progressed, as described below.

In another example, the server 3 determines whether a preset waiting time has progressed in accordance with the activation request (S533), and determines the user status as a waiting completion state if the preset waiting time has progressed (S535). Whether a preset waiting time has progressed is determined by comparing the viewing request time with the waiting completion time.

The server 3 verifies whether the progression of the waiting time is initiated and the preset waiting time has progressed (S533), and determines the user status associated with the user terminal 4 as the waiting completion state when the preset waiting time has elapsed (S535).

If the user status is determined as the waiting completion state in step S535, the viewing authorization is granted and the progression of the waiting time is reset (S537). The progression of the waiting time needs to be reset so as not to affect the determination of whether to grant a new viewing authorization to the sub-content for which the viewing authorization has been granted and to the other sub-content.

In one example, the waiting time management unit 33 determines that a preset waiting time has elapsed when the following condition is satisfied (S533).

$$T_{present} \geq T_{CC}$$

Here, $T_{present}$ represents a current time indicating the viewing request time for the sub-content, and $T_{CC}$ represents a waiting completion time. The waiting time management unit 33 determines that the waiting time has elapsed when the waiting completion time is equal to or is in the past of the current time (S535).

As described above, the activation request may be received along with a viewing request for the sub-content. For example, the first activation request may be received along with a viewing request for a pre-determined sub-content (e.g., the last episode in the free portion or the first episode in the quasi-free portion).

In one example, when the activation request is received for the first time, it is immediately determined that a preset waiting time has elapsed, and it may be set to record the time when the activation request is received as the waiting completion time.

That is, in principle, the server 3 has to record the time obtained by adding the waiting time to the first activation request time as the first waiting completion time, but in the case of the first activation request, the server sets the current time, at which the waiting completion time is recorded according to the first activation request, as the waiting completion time. Then, the requester is able to view the other content portion even when a preset waiting time corresponding to the waiting period has not elapsed after viewing a content portion for which a viewing request is made. In other words, by recording the elapse completion time simultaneously with the initiation of the progression of the waiting time, the determination time becomes equal to or later than (i.e., passed) the waiting completion time, and the user status is determined as the waiting completion state (S535).

In this way, it is possible to immediately provide the user with the first viewing authorization for the quasi-free sub-content while activating the function of initiating the progression of the waiting time, thereby further maximizing the user convenience.

In alternative examples, when receiving an activation request, the server 3 may calculate the waiting completion time based on the time when the activation request was received and the waiting period obtained from the content information table based on a mapping result, to verify the user status.

If the user status is in the waiting completion state when the viewing request for the sub-content is received, the server 3 may grant the viewing authorization (S537). The target for the granted viewing authorization is the quasi-free sub-content contained in the mapped base content.

In some examples, the viewing authorization in step S537 may be the one for the same content portion as the target for which the viewing request is received with the activation request. For example, if the activation request selects the pre-designated sub-content (e.g., the first quasi-free episode) according to the user input, the viewing authorization in step S537 is for the viewing requested portion.

In another example, the viewing authorization in this step S537 may be for a different content portion from the target for which the viewing request is received with the activation request. For example, if the activation request selects a pre-designated sub-content (e.g., the last free episode) according to the user input, the viewing authorization in step S537 may be for the next portion of this pre-designated sub-content.

When the viewing authorization is granted, the elapsed waiting time is reset and the user status is changed to the waiting incomplete state (S537). The changed result (e.g., the reset result or the status change result) is recorded in the user information table.

The waiting time management unit 33 updates the next waiting completion time at which a new viewing authorization for the quasi-free sub-content of the target content is to be granted (S539).

In one example, the next waiting completion time is updated based on the waiting completion time and the waiting period. The next waiting completion time after receiving the first activation request is updated based on the waiting completion time in step S533 and the waiting period in step S539.

In this way, the waiting-based viewing authorization for the quasi-free sub-content is granted, so that the user may view the quasi-free sub-content for free.

The system 1 is configured to allow free viewing of the remaining quasi-free sub-contents based on the waiting period afterwards.

When receiving a viewing request for quasi-free sub-content that is a part of the base content from the user terminal 4, the server 3 verifies whether the user status associated with the user terminal 4 is in a state capable of being granted the waiting-based viewing authorization for the quasi-free sub-content belonging to the mapped base content (i.e., whether the user status is in the waiting completion state), and if the user status associated with the user terminal is in the waiting completion state, the server grants the user account associated with the user terminal of the viewing authorization for the quasi-free sub-content.

The server 3 verifies the viewing authorization newly granted to the user, and transmits, to the requester's user terminal 4, the sub-content information for implementing the content portion requested for viewing at the user terminal. Then, in reaction to the granting of the viewing authorization, the waiting completion state is changed to the waiting incomplete state, and the change result is recorded in the user information table. The next waiting completion time is then updated. Herein, the new waiting completion time is updated based on the time at which a change result is recorded (e.g., the time when the user status is changed to a waiting incomplete state) and the waiting period. The update result may be recorded in the user information table.

For example, if the time at which the user requests viewing of the quasi-free sub-content has passed the waiting completion time, the user may use the viewing authorization to view the quasi-free sub-content that has already been requested. Meanwhile, if the time at which the user requests viewing of the quasi-free sub-content has not passed the waiting completion time, the viewing authorization is not granted. Then, even in case where the user requests viewing of other quasi-free sub-contents after the elapse of the waiting completion time, the viewing authorization is granted and the user may view a different portion from the previously requested one using the granted viewing authorization.

Further, the server 3 may calculate the viewing authorization expiration time of the user based on the time during which the waiting-based viewing authorization for the quasi-free sub-content included in the mapped base content exists, wherein the waiting-based viewing authorization is granted based on the mapping result of the user information table, and the time at which the waiting-based viewing authorization for the quasi-free sub-content is actually granted to the user, and may record it in the user information table. Then, when receiving re-view request for the quasi-free sub-content already provided, the server 3 compares the reception time of the re-view request with the expiration time of viewing authorization, determines whether the waiting-based viewing authorization for the quasi-free sub-content is maintained at the time of the re-viewing request, and provides, if the viewing authorization for the quasi-free sub-content is maintained, the content information immediately in response to the re-viewing request.

Additionally, the waiting time management unit 33 maintains the activation state after the first activation request, and also maintains the activation state of the progression of the waiting time continuously so that the next preset waiting time elapses and the viewing request time for the additional quasi-free sub-content passes the waiting completion time.

The user may be provided by the server 3 with the quasi-free sub-content information for implementing the content portion requested to be viewed in the user terminal by using the granted viewing authorization. The provided information implements (e.g., displays) the corresponding content portion on the user terminal 4.

Additionally, in some examples, the number of viewing authorizations to be granted according to the progression of the preset waiting time may be one or more. Here, one or more viewing authorizations are granted based on the progression of a single preset waiting time. For the progression of a single preset waiting time, a waiting-based viewing authorization for one quasi-free sub-content may be granted, or a viewing authorization for a plurality of quasi-free sub-content may be granted.

Additionally, the system 1 may be further configured to set a target to be authorized to view according to the progression of a preset waiting time. Herein, the target to be authorized may be one or more quasi-free sub-contents. In one example, one or more sequential sub-contents may be designated from the last viewed episode or the last one among the episodes for which the viewing authorizations are already granted. For example, in a case where the last episode viewed by the user is the episode ten which is quasi-free sub-content, a viewing authorization may be granted only for episode eleven or only for episodes from eleven through pre-determined one (e.g., episodes eleven to thirteen) if a preset waiting time has elapsed since episode ten has been viewed. In this case, the system 1 is further configured to indicate the target to be authorized for viewing on the user terminal 4. For example, the user terminal 4 may display an indication that distinguishes the quasi-free sub-content from other quasi-free sub-contents as a target for which the viewing authorization is to be granted/was granted. Herein, the indication includes the remaining time until the viewing authorization may be granted, etc.

In other alternative examples, operations not described in FIG. 5B may be further performed while being added, modified, or excluded.

In an alternative example, for example, the waiting time management unit 33 may further perform, before the step S531, a step of determining whether all of other non-payment based tickets (e.g., including free gift tickets, etc.) granted to the user have been consumed, and/or a step of determining whether the content requested to be provided is a content of which usage is limited in spite that the initiation of the progression of the waiting time is activated (e.g., whether the content is an episode of a predetermined episodes before the latest episode), etc.

In an alternative example, the initial free ticket is excluded from the non-payment based tickets, consumption of which the waiting time management unit 33 determines. An activation request is transmitted by the user terminal 4 after the user terminal satisfies the usage condition for initial free tickets.

In an alternative example, the activation request may be transmitted from the user terminal 4 to the server 3 together with a viewing request for the pre-designated sub-content (e.g., the webtoon episode of the last free portion), if the pre-designated sub-content is selected according to the user input.

In this system 1, the waiting-completion state of the user status is determined in accordance with the grant of the viewing authorization, and the progression of the preset waiting time is initiated again and the elapse of the waiting time is determined again. Therefore, the user uses the content providing service more frequently in order to make as much waiting time to elapse as possible within the same period of time. As a result, the fidelity, dependency, and the like of the user on this content providing service may increase.

In addition, through the waiting-based viewing authorizations for the quasi-free sub-content, the user may experience various contents and may determine more reliably the future purchase plans for the experienced contents. Consequently, it may help a reasonable consumption of the user.

Referring again to FIG. 5A, when the server 3 determines that the user has the viewing authorization so that the content information of the target content requested to be provided may be provided to the user terminal 4, the server provides the content information of the content requested to be provided to the user terminal 4 (S550). In one example, the server 3 transmits to the user terminal 4 a viewing authorization consumption result (including the type of the consumed viewing authorization (e.g., ticket type, etc.), the number of remaining tickets), and/or the next waiting completion time. In addition, the detailed meta information and/or content information of the corresponding content are transmitted to the user terminal 4 so that the content is provided to a user via the user terminal 4.

Meanwhile, referring to FIG. 1, in one example, the server 3 may further include a content generation unit 35 and/or a database storage unit 37. Each component is described in detail.

The content generation unit 35 generates sub-contents by dividing the entire execution section of the base content into a plurality of sub-sections. For example, the entire playback section of the base video is divided into a plurality of sub-sections to generate sub-video information.

Further, the content generation unit 35 generates meta information on the base content, and may generate meta information for individual sub-contents. It is also possible to generate meta information about the base content.

The content generation unit 35 may generate a plurality of sub-content information having various playing time from one base content by variously dividing sub-sections, for example, by dividing the sub-sections evenly and/or unevenly. As a result, the user may make reasonable consumption by partially considering various factors such as mental status, environment, asset status, etc. In addition, it is possible to solve the problem that the user has to make a purchase for the entire base content even though there is a possibility that the user is unable to observe the entire content due to an unexpected reason or becomes disinterested, unlike the intention at the time of the purchase.

The content generation unit 35 may be further configured to encode the sub-contents. The content generation unit 35 may prevent the playing of sub-content on a user terminal not authorized to connect to the system 1 (e.g., user terminal in which an application is not installed) or on a user terminal without ticket.

In one example, the content generation unit 35 may be treated with DRM (Digital Rights Management) to generate sub-content to have viewing authorization (license) information. In this case, the ticket information includes a decoding authorization for decoding the encoded sub-content. For example, the decoding authorization includes a DRM decoding authorization. However, the above example is one example for content encoding, and the disclosure is not limited thereto, but may be further configured to perform various encoding processing.

Next, the database storage unit 37 may store various databases. Herein, a database refers to a set of large amounts of structured, unstructured, or semi-structured data, and may store data related to the auctions already held in the past, and the like. Here, the structured data is data stored in a fixed field, and includes, for example, a relational database, a spreadsheet, etc. Further, the unstructured data is data not stored in a fixed field, and includes, for example, text documents, images, videos, voice data, etc. Further, the semi-structured data is data not stored in a fixed field but including metadata or schema, and includes, for example, XML, HTML, text, etc. The database storage unit 37 may include a user storage including information about a user account, a content storage storing contents provided from a content provider or one or more sub-contents divided therefrom, etc.

Each user of the content providing system 1 is associated with user account information stored in a user information storage. User account information includes descriptive information about the user registered in the system. In one example, the user account information includes a plurality of data fields, each describing one or more attributes of a corresponding system user. Examples of information stored in the user profile include descriptive information such as the user's identity (ID), user terminal information, and ticket information.

The user account information may also include sources (e.g., password, access code, network address of the user terminal, etc.) that authorize the user to access the sub-content providing system 1. The user account information may be referred to as a user status. The user status includes a ticket possession state and/or waiting completion state.

The ticket possession state (i.e., ticket information) includes information indicating whether the user has tickets or the number of tickets possessed. For example, it may be labeled as 1 if there is a ticket and labeled as 0 if no ticket is available; the number of tickets possessed may be represented in a data format such as a binary number; or it may be represented as a combination thereof. If there is a ticket in the user account, it is determined as the viewing authorization for the payment-needed portion (i.e., the payment-needed sub-content or the quasi-free sub-content) may be granted.

In an example, the ticket information may further include category information as a ticket usage range. If the category information is further included, the user having the ticket information may view the contents in the category associated with that ticket only. In one example, the category may be set to one series of artwork. In another example, the category may be set to one entire base content.

In one example, the database storage unit 37 may store a viewing authorization table in which viewing authorization results according to payment, event, gift, and/or elapse of waiting time are recorded, and a ticket consumption table in which consumption results according to usage of viewing authorization (e.g., tickets) and/or expiration are recorded.

In one example, the content storage stores an object representing the content provided by the content provider, or stores an object representing the sub-content produced by the operator of the sub-content system 1.

FIGS. 6A and 6B are diagrams schematically illustrating a user information table and a content information table, according to an example of the present invention.

In one example, the database storage unit 37 may store a user information table in association with the users of the system 1. The user information table includes, but is not limited to, a user identifier, a content identifier as a mapping result according to an activation request, waiting completion time used to grant the waiting-based viewing authorization for the quasi-free sub-content, a determination value indicating a history of receiving the activation request of the user, a viewing authorization expiration time, and the like.

When the server 3 receives an activation request, a determination value indicating a history of receiving the activation request of the user, and waiting completion time at which the waiting-based viewing authorization for the quasi-free sub-content in the base content mapped to the user may be granted are recorded in the user information table.

When receiving the viewing request for the quasi-free sub-content from the user terminal 4, the server 3 may quickly process the operations related to the waiting-based viewing authorization for the quasi-free sub-content based on the information included in the user information table (e.g., waiting completion time or mapping result).

In one example, the content storage stores a content information table in which information about the content at least partially including quasi-free sub-content is recorded. The content information table may include, for example, one or more among a content identifier, target content information indicating whether the content includes quasi-free sub-content (i.e., indicating whether the content may be partially viewed with a waiting-based viewing authorization for the quasi-free sub-content), waiting period, existence period per viewing authorization, and the like. In the waiting completion state, the viewing authorization is not granted for the payment-needed sub-content. The viewing authorization for the payment-needed sub-content is granted by the ticket possession state. The payment-needed sub-content may be set as, for example, a predetermined previous episode(s) from the latest one which is most recently service uploaded, or a predetermined episode(s) from the last episode.

In one example, the existence period information for each viewing authorization depends on the type of viewing authorization. For example, if the viewing authorizations are for quasi-free sub-content, for the same base content, the existence period of viewing authorizations for each sub-content may be the same. Meanwhile, for the free sub-content and the quasi-free sub-content belonging to the same content, the existence period of the viewing authorizations for the free sub-content and the viewing period for the quasi-free sub-content may be the same with or different from each other.

In this way, the database storage unit 37 is dualized into a table in which content-related information associated with the waiting-based viewing authorization for the quasi-free sub-content is recorded, and a table in which user-related data associated with a waiting-based viewing authorization for the quasi-free sub-content is recorded, respectively. Each table is mapped to the quasi-free sub-content if the respective user requests an activation for the respective content. Thus, even if the number of users interested in the base content including the quasi-free sub-content and/or the quantity of the target contents increases, it is possible to efficiently manage the waiting-based viewing authorizations for the quasi-free sub-contents for each user and/or for each target content. In particular, for a plurality of contents associated with one user, different activations (i.e., granting and/or initiation of elapse) of the progression of waiting time (e.g., different waiting completion times) may be applied to each of the individual contents, while for the same content viewed by multiple users, individual activation of the elapse of waiting time (i.e., granting and/or initiation of progression) is applied respectively for each user, so that the user status may be determined uniquely per user, individually for each user for respective artwork, and as a result, an individual time management and grant of the viewing authorization may be effectively performed.

Specifically, in a case where the server 3 receives activation requests for the same base content from the user terminals of first and second users, and the user status of the first and second users are in the waiting completion state after mapping the respective user and the identical base content, if the server 3 receives the viewing request for quasi-free sub-content according to the input of the first user more quickly than the viewing request for quasi-free sub-content according to the input of the second user, the server sets the waiting-completion time of the first user to be faster than that of the second user.

In FIG. 6A, two different users of first and second users have made a viewing request for webtoon A (e.g., by selecting a quasi-free episode in webtoon A); each user and webtoon A have been mapped; and the progression of the waiting time for the webtoon A with respect to each user has been initiated. As shown in FIG. 6B, the waiting period, which is a condition for allowing free view of the quasi-free episode portion in the webtoon A, is 24 hours. If the first user is mapped to the webtoon A at 16:00 on January 31, the viewing authorization for the quasi-free episode is immediately granted for the first time, and when the quasi-free episode is viewed, the waiting completion time at which the next viewing authorization is available based on the waiting period is calculated as 16:00 on February 1. If the second user is mapped to the webtoon A at 16:05 on January 31, the viewing authorization for the quasi-free episode is immediately granted for the first time, and when the quasi-free episode is viewed, the waiting completion time at which the next viewing authorization is available based on the waiting period is calculated as 16:05 on February 1.

The content generation unit 35 and/or the database storage unit 37 of FIG. 1 described above is merely exemplary, and the content providing system 1 may perform the above-described operations in a structure different from FIG. 1, in other examples.

In one example, the content generation unit 35 and/or the storage unit 37 may be a computing device located remotely from the server 3. In this case, the content generation unit 35 and/or the storage unit 37 may be a type of device capable of connecting to the server 3 to perform data communication in accordance with a user's request.

On the other hand, the user terminal 4 is implemented in the form of a smartphone, for example, and may communicate with the server 3 using an application installed in the user terminal 4. Through this communication, various tasks such as a request for provision of the content or sub-content selected by the user, or a payment request for tickets, etc. is performed. However, the type of the user terminal 4 is not limited to the smartphone, and the user terminals 4 may be implemented in the form of various computing devices such as other mobile communication terminals, personal computers, notebook computers, tablets, and Internet Protocol Television (IPTV).

The process of the server 3 providing, through the user terminal 4, the content to the user who is in the state where the waiting-based viewing authorization for the quasi-free sub-content is granted will be described with reference to FIGS. 7 and 8.

Figure 7:
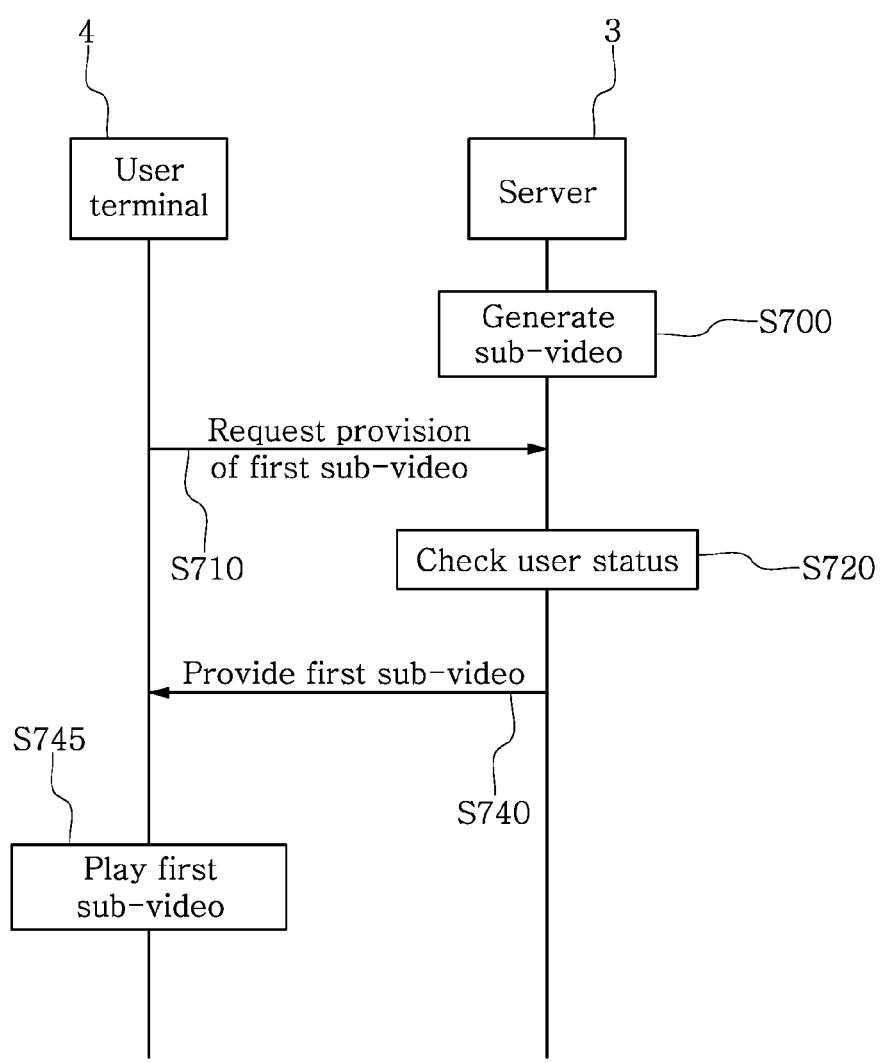
FIGS. 7 to 8 are schematic diagrams illustrating processes for providing a quasi-free sub-content requested by a user in respective situations according to examples of the present invention.
Figure 8:
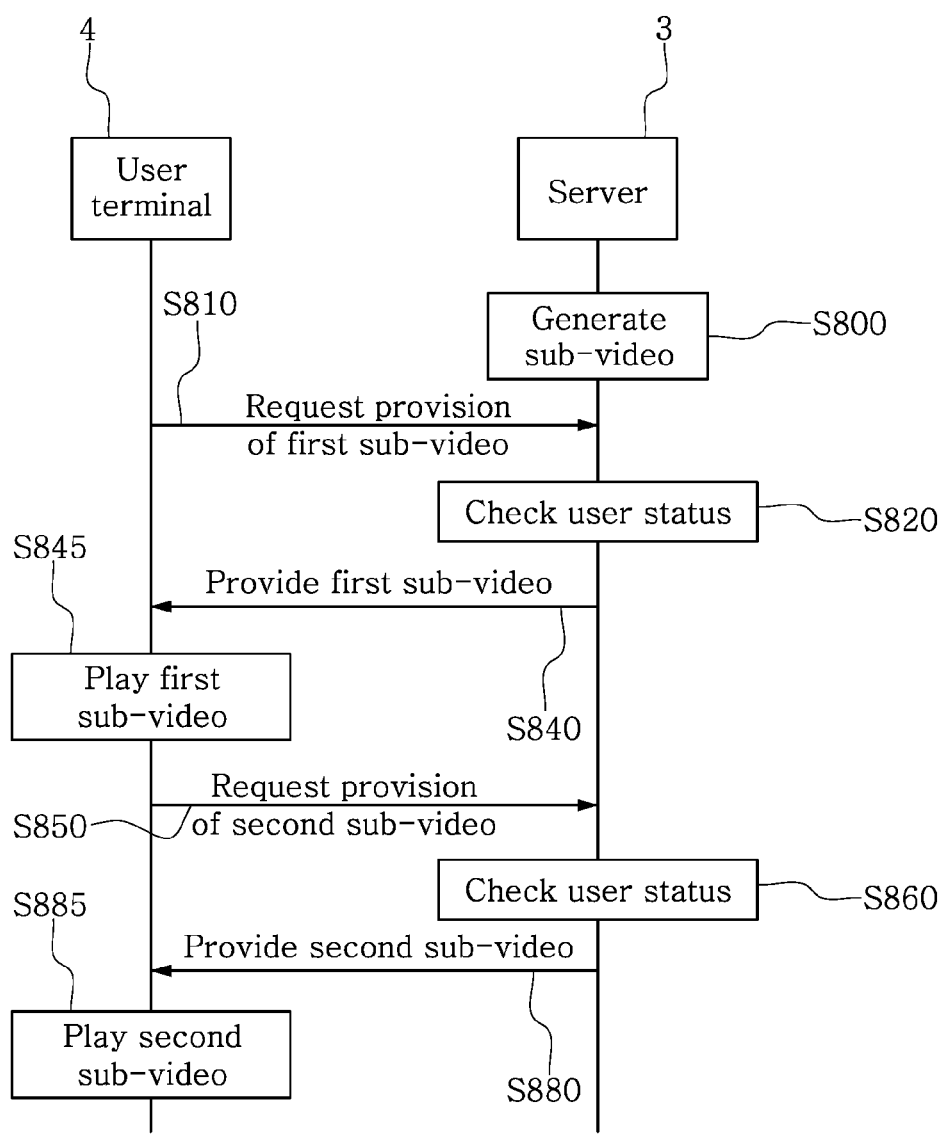

FIGS. 7 and 8 are drawings schematically illustrating a process for providing quasi-free sub-content requested by a user on a situation basis, according to examples of the present invention.

It will be apparent to those skilled in the art that the type of contents requested and presented in FIGS. 7 and 8 is referred to as videos, but is not limited thereto. In addition, detailed descriptions of steps that overlap with each other may be omitted for clarity of description.

FIG. 7 is a diagram for explaining a process in which a user is provided with one content portion using a state in which the user may be granted the waiting-based viewing authorization for the quasi-free sub-content, according to an example of the present invention.

Referring to FIG. 7, the server 3 receives from the user terminal 4 a request for providing a first sub-video of the plurality of sub-videos (S710).

The provision request may be caused by an input signal sensed at the user terminal 4, but may be also caused by an instruction of an application installed in the user terminal 4. In some examples, the content provision request may include a content provision API call instruction.

In one example, the server 3 may generate a plurality of sub-videos which are generated by dividing the basic video into a number of sections before receiving the request (S700). Herein, the first sub-video may be a quasi-free sub-content.

After step S710, the server 3 verifies the viewing authorization information of the user who has requested provision of one or more sub-videos (S720). Based on the verification result, the server 3 determines whether to provide the sub-video information. For example, since a user with a paid ticket has a viewing authorization, the server 3 determines that it is authorized to provide the user terminal 4 with the video information of the first sub-video which is a target for provision request. Alternatively, the server 3 determines that there is an authorization to provide the user terminal 4 with the video information of the first sub-video to be requested to be provided, since the user is in a state of being able to give the waiting-based viewing authorization for the quasi-free sub-content when the waiting time has elapsed for the quasi-free sub-content (i.e., when the request time for providing the first sub-video has elapsed the waiting completion time).

Then, the server 3 provides the video information of the sub-video requested to be provided to the user terminal (S740). The server 3 transmits detailed meta information and/or content information of the sub-video to the user terminal 4. In addition, the server 3 may provide license information such as decoding authorization of the sub-video. In this case, the server 3 is not limited to providing only the detailed meta information, but may further provide basic meta information (e.g., section information) in addition to the detail meta information.

In one example, each sub-video information may consist of a single fragment file. In the case of the download method, it may be said that each piece of sub-video information consists of a single fragment file. In this case, it is relatively advantageous in terms of communication performance and terminal performance.

In another example, for example, in the case of streaming or a progressive downloading, each sub-video information may be composed of a plurality of fragment files. For example, one sub-video information may consist of tens or thousands of fragment files, for example in 10 seconds. Of course, the interval of the fragment file may vary arbitrarily depending on the set value, such as 1 second, 4 seconds, etc. as well as 10 seconds.

When each sub-video information is composed of a plurality of fragment files, the content generation unit 35 generates a fragment list corresponding to each of the divided sub-sections together. The fragment list is a list containing the file name and format for each fragment file, etc. In an example, the content generation unit 35 may generate a first fragment list for the first sub-video, a second fragment list of the second sub-video, and an nth fragment list for the nth sub-video, respectively. Alternatively, as described below, the entire fragment list for the base video may be generated if necessary.

In one example, the server 3 provides a fragment list for the first sub-video.

As a result, the user terminal 4 plays the first sub-video using the first sub-video information (S745). For example, when the user terminal 4 receives a fragment list, the user terminal 4 stores the fragment list for the first sub-video in the playlist. Thereafter, the content information of the fragment file may be provided using the meta information of a fragment file included in the fragment list to play the first sub-video.

In this way, since the fragment list is provided to the user terminal 4 when there is a request for provision from the user terminal 4, information to be stored in the memory of the user terminal 4 is relatively less, thereby improving the application performance.

FIG. 8 is a diagram for explaining a process in which a user is provided with contents by using one or more tickets for one or more contents, respectively, according to an example of the present invention.

Referring to FIG. 8, the server 3 receives from the user terminal 4 a request for providing a first sub-video among the plurality of sub-videos (S810).

In one example, the server 3 may generate a plurality of sub-videos by dividing the basic video into a plurality of sections before receiving the request (S800).

After step S810, the server 3 verifies the viewing authorization information associated with the user account that requested the provision of the first sub-video (S820). Based on the verification result, the server 3 determines whether to provide the sub-video information. For example, since a user with the paid tickets has viewing authorization, it is determined to provide the requested sub-video portion.

The server 3 may receive the provision request for the second sub-video including the next section and provide it to the user terminal 4. In the above example, the server 3 may receive, from the user terminal 4, a provision request for the second sub-video including the next section before the provision of the first sub-video is completed, i.e., before the completion of playing of the first sub-video (S850). In step S850, the provision request for the second sub-video may be performed automatically (e.g., without a separate consent of the user). In this case, the server 3 verifies whether there is a viewing authorization enabling provision of the second sub-video including the next section based on the viewing authorization information associated with the user account (S860).

When there is a viewing authorization (e.g., the presence of the paid ticket) that enables the provision of the second sub-video to the user terminal 4 as a result of the verification of the server 3, it determines the provision and provides the second sub-video information to the user terminal 4 (S880). For example, a fragment list for the second sub-video may be provided.

In this case, the user terminal 4 may add the fragment list for the second sub-video to the fragment list of the first sub-video in order to seamlessly play the second sub-video after the playback of the first sub-video is completed. In this way, the second sub-video may be played in a frame-seamless successive manner after the playing of the first sub-video is completed. Accordingly, even when a user views a plurality of sub-videos in a successive manner, seamless playing is possible, which in turn, provides high user convenience.

In addition, when the viewing authorization (e.g., the ticket information) related to the second sub-video is checked while the first sub-video is being played, it is also possible to provide the second sub-video information to the user terminal 4 and at the same time transmit a signal to display a screen indicating that the viewing-authorization information (e.g., the ticket information) is updated on the user terminal 4.

For example, it is also possible to transmit a signal to make a pop-up window such as "one ticket is consumed" to be displayed at the same time when the playing of the second sub-video is started.

Meanwhile, upon verifying the viewing authorization, even if there is no authorization to view the next section, it is possible to automatically provide a sub-video of the next section. In one example, upon verifying the viewing authorization information, if there is no viewing authorization to play the next section, it is possible to purchase a viewing authorization (e.g., purchased ticket) for the subsequent section without the request for additional consent. As a result, the sub-video of the next section may be provided from the server 4. Herein, a notice related to the automatic purchase may be provided to the user before or after the automatic purchase. That is, if the user does not take a separate action before the automatic purchase, it is possible to provide a notice that the ticket is automatically purchased and the sub-video of the next section is provided, and to provide an informational screen for informing the user of completion of the purchase when the purchase occurs automatically.

In some cases, the server 3 may receive a provision request for a third sub-video including a section that is not consecutive from the first sub-video being played, and in such a case as well, a fragment list for the third sub-video may be added and provided to the fragment list for the first sub-video, as described above. That is, the fragment list being added is not limited to being consecutive from the sub-video to being played.

In addition, in the viewing authorization verification step S820, the server 3 grants the viewing authorization to the user for the provision requested content depending on whether the user is in a user status in which waiting-based viewing authorization for the quasi-free sub-content may be granted.

In one example, before the provision of the first sub-video based on the usage of the paid ticket is completed, the server 3 may receive a further provision request for the next section of sub-video (e.g. the second sub-video) from the user terminal.

Then, after starting the provision of the first sub-video and before receiving the further provision request for the second sub-video, if the activated and initiated waiting time has elapsed (i.e., the second further provision request time has passed the waiting completion time), the server 3 grants the waiting-based viewing authorization for the quasi-free sub-content to the user. Then, the second sub-video requested to be additionally provided may be provided to the user terminal based on the newly granted waiting-based viewing authorization for the sub-content.

In one example, before the provision of the sub-video based on the waiting-based viewing authorization for the quasi-free sub-content already granted within the content category corresponding to the usage range of waiting-based viewing authorization for the quasi-free sub-content of the target content is completed, the server 3 may receive from the user terminal 4 an additional provision request for a sub-video of the next section. Then, the server 3 verifies possession of a viewing authorization to provide the sub-video requested additionally based on the user's ticket information. Typically, since the waiting period is set longer than the playing time of the sub-video, a user who has viewed one sub-video based on the waiting completion state is not able to use the existing waiting completion state again to view the sub-video in the next section. Therefore, if the user has the paid ticket and/or another free ticket, the sub-video requested additionally may be provided to the user terminal 4 based on the ticket held by the user.

In another example, the server 3 may generate a fragment list and, upon receiving a provision request from the user terminal 4, provide a fragment list including a fragment file for a non-requested sub-video. That is, a fragment file for a section without a separate request from the user terminal 4 may be provided in advance.

In one example, the fragment list may be a fragment list for the entire section.

As a result, a fragment list for the entire section is registered in the user terminal 4 before the provision request, so that it may be easier to play the fragment list automatically in a successive manner or seamlessly.

The steps described above in FIGS. 7 to 8 are merely exemplary, and may be different in order or omitted depending on the setting state of the server 3 and/or the terminal 4.

Although the sub-content is described as a video in examples in FIGS. 7 and 8, the present invention is not limited thereto.

For example, if the content is text or a text-to-image combination, and the entire content section of the content includes a plurality of episodes, each episode corresponds to each sub-content. At least some of the sub-content among the payment-needed episodes may be allowed to be provided for free according to elapsing of the waiting period. This is because viewing authorization according to elapsing of the waiting period is granted for the quasi-free sub-content.

According to the content providing system and method having an efficient database architecture for individualized time management according to the examples described above, since a user may partially purchase the sub-contents which are multiple episodes or sections divided from the base content, it is possible to enable a user to take selective and active consumption action with respect to sub-content in which only some of the entire content may induce the user's interest.

The operations by the content providing system and method according to the above-described examples may be at least partially embodied in a computer program and recorded in a computer-readable recording medium.

The computer may be a personal computer, a desktop computer, a laptop computer, a notebook, a smart phone, or their similar computing device and any integrated device. The computer is a device having one or more processor for alternative and special purposes, a memory, a storage space, and a networking component (either wireless or wired). The computer may execute an operating system (OS), for example, OS compatible with Microsoft's Windows, Apple OS X or iOS, Linux distribution, or Google's Android OS.

The computer program includes a set of instructions executable in the above-described computer, and its name may be different depending on the type of the computer. For example, when the type of the computer is a smart phone, the computer program may be referred to as app.

The computer-readable recording media having recorded thereon a program for performing the operation by the system and method for providing contents according to examples include all types of recording devices in which computer-readable data is stored. Examples of the computer-readable recording media are ROM, RAM, CD-ROM, magnetic tape, floppy disk, and optical data storage devices, etc. Additionally, the computer-readable recording media is distributed over computer systems connected via a network and may store and execute the computer-readable codes in a distributed manner. Additionally, functional programs, codes and code segments for realizing this example will be easily understood by persons having ordinary skill in the technical field to which this example belongs.

While the disclosure has been hereinabove described with reference to the examples shown in the drawings, this is provided for illustration purposes only and it will be appreciated by those having ordinary skill in the art that various modifications and variations may be made thereto. However, it should be noted that such modifications fall within the technical protection scope of the disclosure. Therefore, the true technical protection scope of the disclosure should be defined by the technical spirit of the appended claims.

INDUSTRIAL APPLICABILITY

The content-providing method and system via efficient database architecture for individualized time management according to an aspect of the present invention has an advantage of efficiently performing the above-described content-specific and user-specific individual settings through a duplex database architecture. In particular, it is possible to perform a quick data processing simultaneously with an efficient database management through the database architecture even in a situation where the number of users and contents are greatly increased by mapping etc. between tables based on a base content associated with a quasi-free sub-contents when activation of quasi-free sub-contents is requested. Accordingly, it is possible to more efficiently manage a specific condition of a certain time elapse for each individual user. As a result, it is possible to further enhance user's platform satisfaction and fidelity and increase revenue.

The invention claimed is:

1. A content-providing method for providing contents via an efficient database architecture for individualized time management, wherein the method is performed by a server configured to provide a plurality of sub-contents constituting a content, the method comprising:

transmitting, based on a content information table in a database containing meta information about a content, an information about a base content comprising of a plurality of sub-contents to a user terminal—the information about said base content including whether or not a quasi-free sub-content, which is provided for free after progression of a preset waiting time for a part of a content provided as a fee, is included;

receiving from the user terminal a viewing request for a sub-content according to a user input, wherein the viewing request is transmitted from the user terminal together with an activation request related to a waiting-based viewing authorization for the quasi-free sub-content;

mapping a user of the user terminal and a base content associated with the quasi-free sub-content for which the activation request has been received, and recording a mapping result in the user information table in the database; and initiating a progression of a preset waiting time based on the mapping result recorded in the user information table and a waiting period information associated with the base content included in the content information table, so as to grant the user of a waiting-based viewing authorization for one or more quasi-free sub-contents.

2. The content-providing method according to claim 1, wherein the content information table comprises: a content identifier; a target content information indicating whether a base content indicated by the content identifier includes a quasi-free sub-content; and a waiting period information associated with the base content; and wherein the user information table comprises: a user identifier; and a content identifier of the base content associated with the user and the sub-content for which the viewing request is received, as a result of mapping.

3. The content-providing method according to claim 2, wherein the method further comprising:

recording, in the user information table, a determination value indicating a history of receiving the activation request from the user terminal, and an waiting completion time for determining a progression of the waiting time;

verifying whether the waiting time has progressed up to the preset waiting time; and determining, in case where the preset waiting time has elapsed, a user status of the user of the user terminal as an waiting completion state; and wherein the waiting completion time is calculated based on a waiting period by obtaining a waiting period information of the base content which is mapped from the content information table based on the mapping result.

4. The content-providing method according to claim 3, wherein when the activation request is received, the waiting completion time is calculated based on a time at which the activation request is received, and the waiting period obtained from the content information table based on the mapping result.

5. The content-providing method according to claim 3, wherein, when the activation request is initially received, it is set that a preset waiting time has elapsed, and the time at which the activation request is initially received is recorded as the waiting completion time.

6. The content-providing method according to claim 3, further comprising the steps of:

receiving a viewing request for a quasi-free sub-content that is a part of the base content from the user terminal;

verifying whether a user status associated with the user terminal is in a waiting-completion state;

granting a viewing authorization for the quasi-free sub-component to a user account associated with the user terminal, if the user status associated with the user terminal is in a waiting-completion state, wherein a target of the viewing authorization is a quasi-free sub-content included in the mapped base content;

transmitting, to the user terminal, a quasi-free sub-content information for implementing at the user terminal the quasi-free sub-content which is requested for view; and changing the user status from the waiting completion state to a waiting-incomplete state in response to the grant of the viewing authorization.

7. The content-providing method according to claim 6, further comprising: updating a new waiting completion time based on a time at which the user status is changed to the waiting-incomplete state and the waiting period, after providing the quasi-free sub-content information according to the viewing request.

8. The content-providing method according to claim 3, further comprising:

granting one or more waiting-based viewing authorizations for the quasi-free sub-content in case of the waiting-completion state, wherein the target of the one or more viewing authorizations is provided based on the progression of a single preset waiting time.

9. The content-providing method according to claim 6, further comprising:

granting, in case where the user account associated with the user terminal has one or more virtual money, the viewing authorization for the requested quasi-free sub-content; and recording a result of consumption of the one or more of virtual money in the user information table.

10. The content-providing method according to claim 6, wherein the content information table further comprises an existence period of the viewing authorization for the quasi-charge sub-content associated with the base content; and wherein the method further comprises:

obtaining the existence period of the viewing authorization for the quasi-free sub-content based on the mapping result of the user information table, after granting the viewing authorization for the quasi-free sub-content requested for viewing, and calculating an expiration time of the previously granted viewing authorization based on the time at which the viewing authorization is granted for the quasi-free sub-content requested for viewing and the existence period;

comparing, when receiving a re-viewing request for the quasi-free sub-content, the received time at which the re-viewing request is received and the expiration time of the viewing authorization to verify whether the viewing authorization for the quasi-free sub-content is maintained; and providing immediately, if the viewing authorization for the quasi-free sub-content is maintained, the quasi-free sub-content information in response to the re-viewing request.

11. A non-transitory computer readable recording medium which is readable by a computer and stores a program instruction executable by the computer, wherein when the program instruction is executed by a processor of the computer, the processor performs the content providing method according to claim 1.

12. A server for a plurality of sub-contents constituting a content, the server being configured to:

transmit, based on a content information table in a database containing meta information about a content, an information about a base content comprising of a plurality of sub-contents to a user terminal—the information about said base content including whether or not a quasi-free sub-content, which is provided for free after progression of a preset waiting time for a part of a content provided as a fee, is included;

receive from the user terminal a viewing request for a sub-content according to a user input, wherein the viewing request is transmitted from the user terminal together with an activation request related to a waiting-based viewing authorization for the quasi-free sub-content;

map a user of the user terminal and a base content associated with the quasi-free sub-content for which the activation request has been received, and record a mapping result in a user information table in a database; and initiate a progression of a preset waiting time based on the mapping result recorded in the user information table and a waiting period information associated with the base content included in the content information table, so as to grant the user of a waiting-based viewing authorization for one or more quasi-free sub-contents.

13. The server according to claim 12, wherein the content information table comprises: a content identifier; target content information indicating whether a base content indicated by the content identifier includes quasi-free sub-content; and a waiting period information associated with the base content; and wherein the user information table comprises: a user identifier; and a content identifier of the base content associated with the user and the sub-content for which the viewing request is received, as a result of mapping.

14. The server according to claim 13, wherein the server is further configured to:

record, in the user information table, a determination value indicating a history of receiving the activation request from the user terminal, and an waiting completion time for determining an progression of the waiting time;

verify whether the waiting time has progressed up to the preset waiting time; and determine, in case where the preset waiting time has elapsed, a user status of the user of the user terminal as an waiting completion state; and wherein the waiting completion time is calculated based on a waiting period by obtaining a waiting period information of the base content which is mapped from the content information table based on the mapping result.

15. The server according to claim 14, wherein when the activation request is received, the server calculates the waiting completion time based on a time at which the activation request is received, and the waiting period obtained from the content information table based on the mapping result.

16. The server according to claim 14, wherein it is set that the preset waiting time has elapsed when the activation request is initially received, and a time at which the activation request is initially received is recorded as the waiting completion time.

17. The server according to claim 14, wherein the server is further configured to:

receive a viewing request for quasi-free sub-content that is a part of the base content from the user terminal;

verify whether a user status associated with the user terminal is in a waiting-completion state;

grant a viewing authorization for the quasi-free sub-component to a user account associated with the user terminal, if the user status associated with the user terminal is in a waiting-completion state, wherein a target of the viewing authorization is a quasi-free sub-content included in the mapped base content;

transmit, to the user terminal, a quasi-free sub-content information for implementing at the user terminal the quasi-free sub-content which is requested for view; and change the user status from the waiting completion state to a waiting-incomplete state in response to the grant of the viewing authorization.

18. The server according to claim 17, wherein the server is further configured to update a new waiting completion time based on a time at which the user status is changed to the waiting-incomplete state and the waiting period, after providing the quasi-free sub-content information according to the viewing request.

19. The server according to claim 18, wherein the server is further configured to grant one or more waiting-based viewing authorizations for the quasi-free sub-content in case of the waiting-completion state; and wherein the target of the one or more viewing authorizations is provided based on the progression of a single preset waiting time.

20. The server according to claim 17, wherein the server is further configured to:

grant, in case where the user account associated with the user terminal has one or more virtual money, the viewing authorization for the requested quasi-free sub-content; and record a result of consumption of the one or more of virtual money in the user information table.

21. The server according to claim 17, wherein the content information table further comprises an existence period of the viewing authorization for the quasi-charge sub-content associated with the base content; and wherein the server is further configured to:

obtain the existence period of the viewing authorization for the quasi-free sub-content based on the mapping result of the user information table, after granting the viewing authorization for the quasi-free sub-content requested for viewing, and calculating an expiration time of the previously granted viewing authorization based on the time at which the viewing authorization is granted for the quasi-free sub-content requested for viewing and the existence period;

compare, when receiving a re-viewing request for the quasi-free sub-content, the received time at which the re-viewing request is received and the expiration time of the viewing authorization to verify whether the viewing authorization for the quasi-free sub-content is maintained; and provide immediately, if the viewing authorization for the quasi-free sub-content is maintained, the quasi-free sub-content information in response to the re-viewing request.

22. The server according to claim 12, wherein in case where the user status of a first user and a second user are in the waiting completion state after activation requests for the same base content from the user terminals of the first and second users are received and each user and the same base content are mapped, respectively, if the server receives a viewing request for the quasi-free sub-content according to an input by the first user earlier than a viewing request for quasi-free sub-content according to input by the second user, the server sets the waiting completion time of the first user to be earlier than the waiting completion time of the second user.

* * * * *